(12) United States Patent
Zhou et al.

(10) Patent No.: US 7,280,269 B2
(45) Date of Patent: Oct. 9, 2007

(54) FAST DYNAMIC GAIN CONTROL IN CASCADED RAMAN FIBER AMPLIFIERS

(75) Inventors: Xiang Zhou, Holmdel, NJ (US); Martin Birk, Belford, NJ (US)

(73) Assignee: AT&T Corporation, Bedminster, NJ (US)

( * ) Notice: Subject to any disclaimer, the term of this patent is extended or adjusted under 35 U.S.C. 154(b) by 0 days.

(21) Appl. No.: 11/424,308

(22) Filed: Jun. 15, 2006

(65) Prior Publication Data

US 2007/0109624 A1    May 17, 2007

Related U.S. Application Data

(63) Continuation-in-part of application No. 11/274,666, filed on Nov. 15, 2005, now Pat. No. 7,142,356.

(51) Int. Cl.
*H01S 4/00* (2006.01)
*H04B 10/12* (2006.01)

(52) U.S. Cl. ...................................... 359/334
(58) Field of Classification Search ................. 359/334
See application file for complete search history.

(56) References Cited

U.S. PATENT DOCUMENTS

| | | | |
|---|---|---|---|
| 6,236,500 B1 | 5/2001 | Suzuki et al. | |
| 6,417,965 B1 | 7/2002 | Ye et al. | |
| 6,441,950 B1 | 8/2002 | Chen et al. | |
| 6,498,677 B1 | 12/2002 | Sun et al. | |
| 6,510,000 B1 | 1/2003 | Onaka et al. | |
| 6,574,037 B2 | 6/2003 | Islam et al. | |
| 6,624,926 B1 | 9/2003 | Hayashi et al. | |
| 6,690,504 B1 | 2/2004 | Nagel et al. | |
| 6,912,084 B2 * | 6/2005 | Freund | ...................... 359/334 |
| 6,958,856 B2 | 10/2005 | Inoue et al. | |

(Continued)

FOREIGN PATENT DOCUMENTS

EP          1248 334           10/2002

(Continued)

OTHER PUBLICATIONS

Yihong, Chen et al., "Bi-directionally pumped broadband Raman amplifier," ECOC, Sep. 2001, pp. 230-231, Freehold, NJ.

(Continued)

*Primary Examiner*—Jack Keith
*Assistant Examiner*—Eric Bolda
(74) *Attorney, Agent, or Firm*—Banner & Witcoff, Ltd.

(57) ABSTRACT

The present invention provides methods and apparatuses for controlling a gain of a bidirectionally-pumped Raman fiber amplifier having both forward optical pumps and backward optical pumps. The overall gain is controlled by adjusting the forward optical pumps, while the power levels of the backward optical pumps are essentially fixed. Gain circuitry operates in an opened loop configuration and uses a predetermined function relating a power variation of at least one wavelength region with a pump power adjustment for at least one forward optical pump. Two approximate linear relationships between the input signal power variations and the required pump power adjustments are utilized in controlling the Raman fiber amplifier. Each approximate linear relationship includes at least one linear coefficient that relates a power variation for a specific wavelength region and a power adjustment of a specific Raman pump.

5 Claims, 38 Drawing Sheets

U.S. PATENT DOCUMENTS

| | | | |
|---|---|---|---|
| 7,016,104 B2 * | 3/2006 | Mao et al. | 359/334 |
| 7,038,843 B2 | 5/2006 | Denkin et al. | |
| 2002/0044343 A1 | 4/2002 | Manzur | |
| 2002/0054733 A1 | 5/2002 | Nobuyuki | |
| 2002/0186456 A1 | 12/2002 | Inoue et al. | |
| 2003/0147124 A1 | 8/2003 | Masayuki | |
| 2003/0210457 A1 | 11/2003 | Emori et al. | |
| 2004/0052453 A1 | 3/2004 | Mao et al. | |

FOREIGN PATENT DOCUMENTS

| | | |
|---|---|---|
| WO | 2004032383 A | 4/2004 |

OTHER PUBLICATIONS

Kado, Soko et al., "Broadband flat-noise Raman amplifier using low-noise bi-directionally pumping sources," ECOC, 2001, pp. 1-2, Kanagawa, Japan.

Essiambre, Rene-Jean et al. "Design of Bidirectionally Pumped Fiber Amplifiers Generating Double Rayleigh Backscattering," IEEE Photonics Technology Letters, Jul. 2002, pp. 914-916, vol. 14, No. 7, USA.

Bromage, J. et al., "High co-directional Raman gain for 200-km spans, enabling 40×10.66 Gb/s transmission over 2400 km," OFC, 2003, pp. PD24-1 to PD24-3, Holmdel, NJ.

Chen, C.J. et al., "Control of transient effects in distributed and lumped Raman amplifier," Electronic Letters, Oct. 2001, pp. 1304-1305, vol. 37, No. 21, USA.

Wang, L.L., et al., "Gain transients in co-pumped and counter-pumped Raman amplifiers," IEEE Photonics Technology Letters, May 2003, pp. 664-666, vol. 15, No. 5, USA.

Zhou, Xiang et al., "Theoretical investigation of fiber Raman amplifier with dynamic gain control", OFC, 2001, pp. WDD17-1-WDD17-3, Singapore.

Bolognini, G. et al., "Transient effects in gain-clamped discrete Raman amplifier cascades", IEEE Photonics Technology Letters, Jan. 2004, pp. 66-68, vol. 16, No. 1, USA.

Zhou, Xiang et al., "Submicrosecond Transient Control for a Forward-Pumped Raman Fiber Amplifier", IEEE Photonics Technology Letters, 2005, pp. 2059-2061, vol. 17, No. 10, USA.

Zhou, Xiang et al., "A new technique for dynamic gain profile control in a multi-wavelength backward-pumped discrete Raman amplifier", 2001, pp. 1-3, USA.

Kim, Pilhan et al. "Semianalytic Dynamic Gain-Clamping Method for the Fiber Raman Amplifier", IEEE Photonics Technology Letters, Apr. 2005, pp. 768-770, vol. 17, No. 4, USA.

Zhou, Xiang et al. "Fast, low-cost method for control of gain and tilt transients in a forward-pumped Raman amplifier", Sep. 2005, USA.

* cited by examiner

FAST DYNAMIC GAIN CONTROL IN CASCADED RAMAN FIBER AMPLIFIERS

This application is a continuation-in-part of common-owned application Ser. No. 11/274,666, now U.S. Pat. No. 7,142,356, entitled, "Fast dynamic gain control in an optical fiber amplifier", filed on Nov. 15, 2005, and issued on Nov. 28, 2006, naming Xiang Zhou and Martin Birk as inventors.

FIELD OF THE INVENTION

The present invention relates to dynamically controlling the gain of an optical fiber amplifier.

BACKGROUND OF THE INVENTION

Distributed Raman fiber amplification has been proven to be a powerful technique to improve the optical signal to noise ratio (OSNR) margin of long haul wavelength-division multiplexing (WDM) system. The discrete Raman fiber amplifier is also an effective method to compensate the loss of the dispersion fiber module and/or provide extra bandwidth. A Raman fiber amplifier can be configured either as a forward-pumped Raman fiber amplifier (RFA) or as a backward-pumped RFA. It has been shown that using both forward-pumped RFA and backward-pumped RFA can achieve better noise performance and Rayleigh crosstalk performance than purely backward pumping, and therefore enables very long span WDM transmission. On the other hand, optical communication is evolving from current point-to-point systems to dynamic optical networks. In a dynamic optical network, channels will be added and dropped to meet the varying capacity demands. In addition, accidental loss of channels due to fiber cut or from amplifier failure will also lead to variation of the overall optical power in the transmission system. To keep the power of the surviving channels at a constant level, fast dynamic gain control is indispensable for both forward-pumped distributed/discrete RFA and backward-pumped distributed/discrete RFA, as well as EDFA's. Two control approaches have been demonstrated in recent years. For the first approach, the Raman pump powers are controlled by a closed negative feedback loop, in which the signal gains are continuously monitored and compared with the target gain. The error control signal is usually generated through a proportional, integral and differential (PID) control algorithm. FIG. 1A shows dynamic gain control apparatus 100 for a multi-wavelength forward-pumped Raman fiber amplifier according to prior art. FIG. 1B shows dynamic gain control apparatus 150 for a multi-wavelength Backward-pumped Raman fiber amplifier according to prior art. This approach exhibits a typical control speed of tens to several hundred microseconds. The corresponding speed may be acceptable for a backward-pumped distributed RFA. This approach is not typically fast enough for a forward-pumped RFA (either distributed or discrete), and many times even not fast enough for a backward-pumped discrete RFA, which typically has much shorter fiber length than a distributed RFA. This observation is due to the fact that the gain transients of a forward-pumped RFA are decided by the walk-off time (sub-$\mu$s) between the signal and the pump while a backward-pumped RFA is decided by the transit time through the fiber (hundreds of $\mu$s for a typical distributed RFA).

The second demonstrated method is referred to the all-optical gain clamping technique, which is based on a closed optical feedback loop. However this method introduces noise degradation and is not faster than the first method due to the same nature (closed feedback loop). With another approach, a dynamic gain control scheme based on a predetermined table between the detected output signal power variations and the required pump power adjustments has been proposed for a backward-pumped RFA. Because the look-up table varies with the load (i.e., the power of the input signals), not only is an extra control loop needed to detect the load, but also numerous tables are required to be stored in the control circuits. This not only increases its implementation complexity/cost, but also slows its capability of dynamic gain control.

There is a real need in the art for a fast and efficient dynamic gain control technique suitable for both forward-pumped distributed/discrete RFA and backward-pumped discrete RFA as well as other types of optical fiber amplifiers such as Erbium doped fiber amplifiers (EDFA's).

BRIEF SUMMARY OF THE INVENTION

The present invention provides methods and apparatuses for dynamically controlling a gain for cascaded Raman fiber amplifiers (RFAs). Gain circuitry operates in an opened loop configuration and uses a predetermined function relating a power variation of at least one wavelength region with a pump power adjustment for at least one optical pump.

With an aspect of the invention, two cascaded Raman fiber amplifiers are configured as a bidirectionally-pumped Raman fiber amplifier having forward Raman pumps and backward Raman pumps coupled to an optical fiber facility. The power levels of the backward Raman pumps are essentially fixed. However, the pump power adjustment is dynamically controlled using a feed-forward dynamic gain control algorithm.

With another aspect of the invention, the feed-forward dynamic gain control algorithm utilizes one of the two approximate linear relationships.

With another aspect of the invention, each approximate linear relationship includes at least one linear coefficient that relates a power variation for a specific wavelength region and a power adjustment of a specific Raman pump.

With another aspect of the invention, each linear coefficient of an approximate linear relationship is determined by experimentally observing or simulating an optical fiber system. Optical signal channels are configured so that the power variations of all of the wavelength regions may be ignored except for a specific wavelength region. A corresponding linear coefficient is determined by dividing the corresponding power adjustment for the specific pump by the power variation of the specific wavelength region.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Definitions for the following terms are included to facilitate an understanding of the detailed description.

Optical fiber amplifier—a device to amplify an optical signal from an optical fiber facility without converting the signal from optical to electrical back again to optical energy.

Optical pump—a shorter wavelength laser that is used to pump a length of optical fiber with energy to provide amplification of one or more longer wavelengths.

Forward optical pump: a power source that provides power to a signal by a co-propagating signal-pump optical interaction. An example is a forward Raman pump that is based on Raman interaction.

Backward optical pump: a power source that provides power to signal by counter-propagating signal-pump optical interaction. An example is a backward Raman pump that is based on Raman interaction.

Figure 1A:
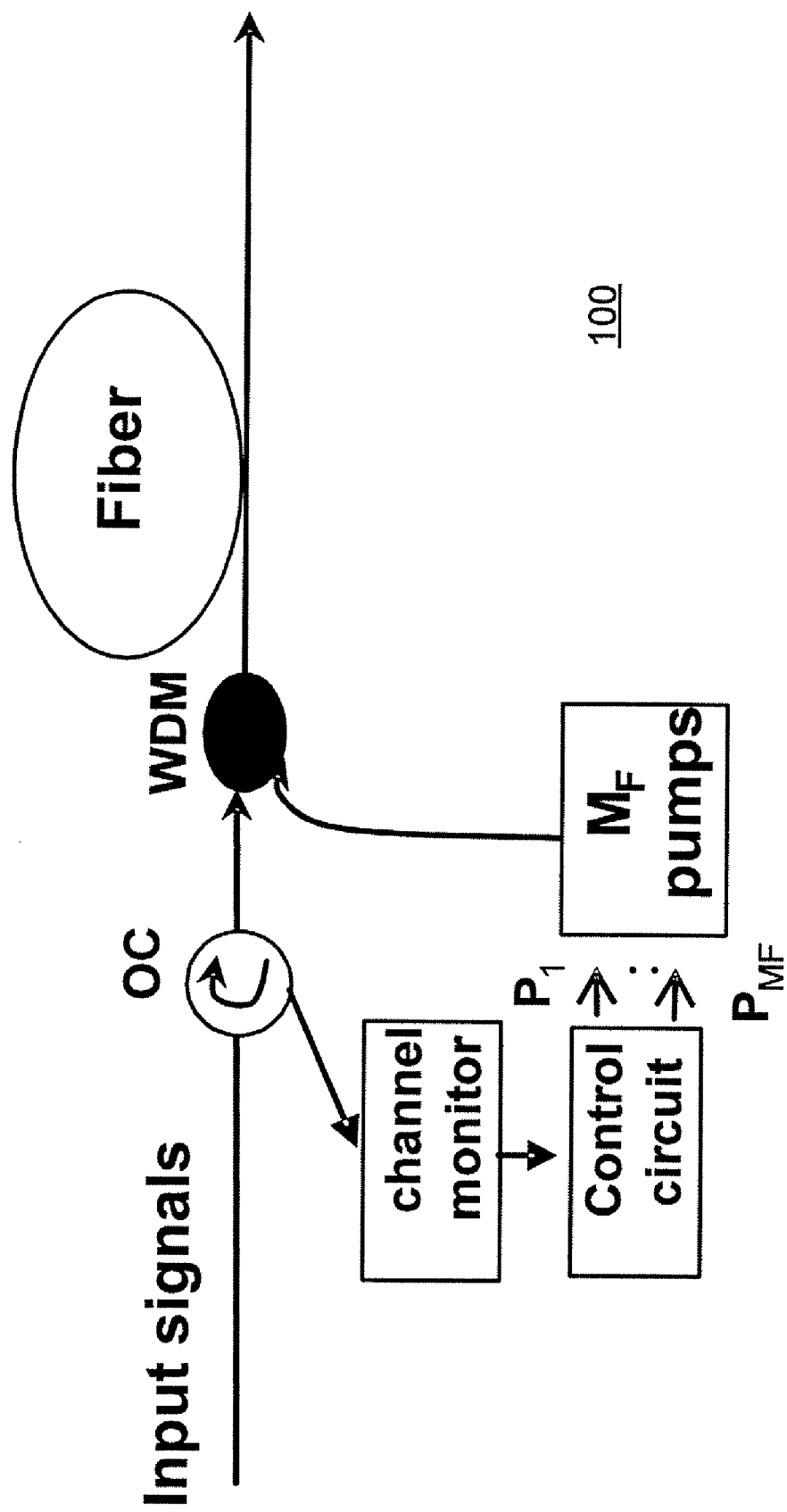
FIG. 1A shows dynamic gain control method for a multi-wavelength forward-pumped Raman fiber amplifier according to prior art.
Figure 1B:
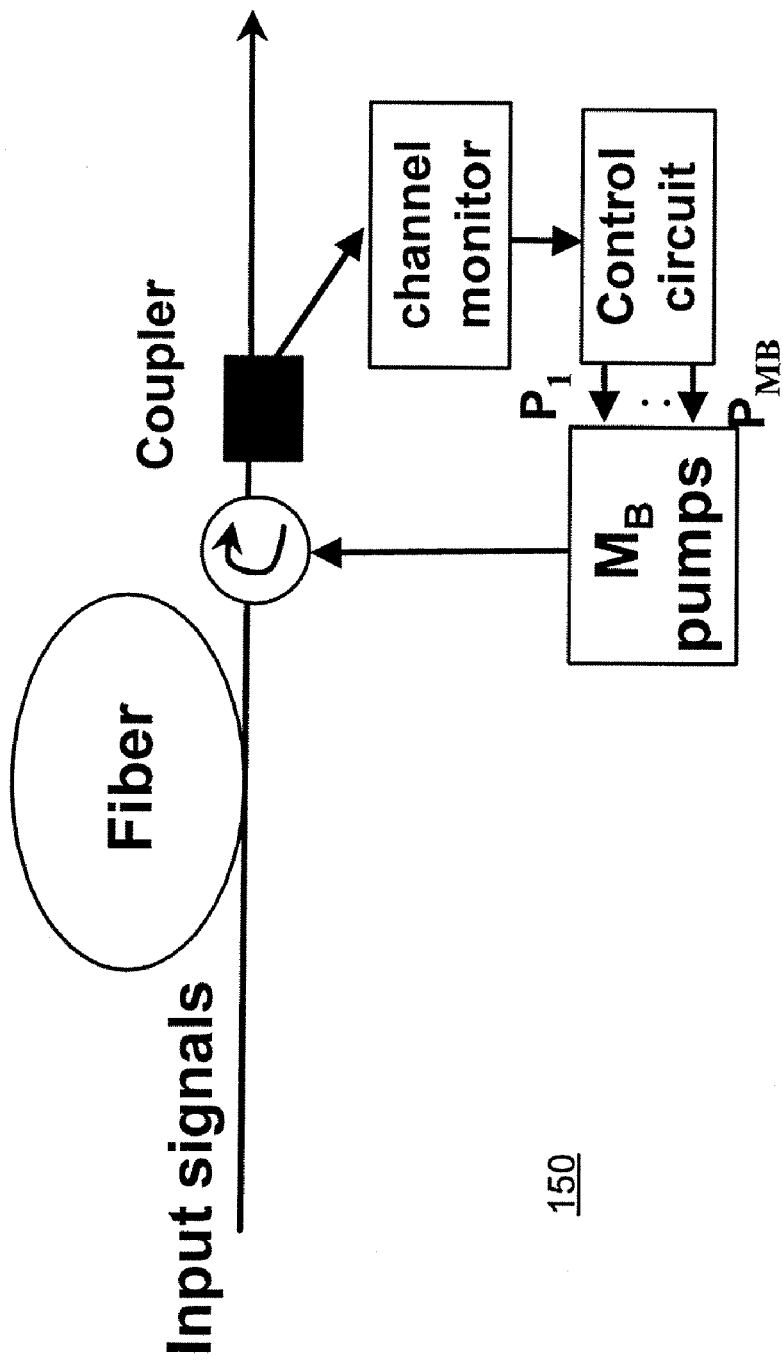
FIG. 1B shows dynamic gain control method for a multi-wavelength Backward-pumped Raman fiber amplifier according to prior art.
Figure 2:
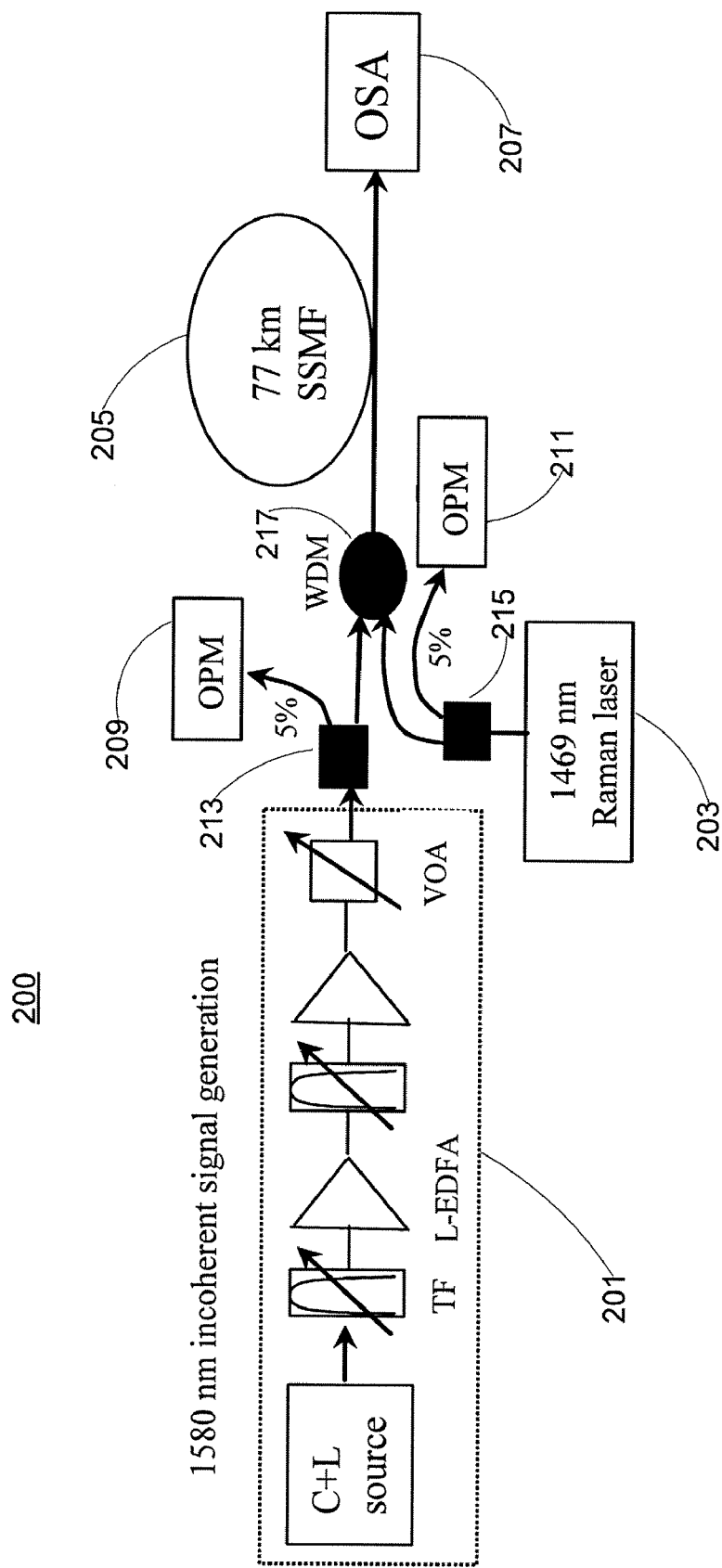
FIG. 2 shows an experimental setup for a forward-pumped Raman fiber amplifier in accordance with an embodiment of the invention.

FIG. 2 shows an experimental setup 200 for a forward-pumped Raman fiber amplifier in accordance with an embodiment of the invention. Experimental setup 200 comprises signal generator 201 coupler 213, coupler 215, multiplexer 217, fiber facilities 205, Raman laser 203, optical power meter (OPM) 209, OPM 211, and optical spectrum analyzer (OSA) 207. Coupler 213 provides a portion (approximately 5%) of the generated power from signal generator 201 to OPM 209. Raman laser injects power at approximately 1469 nm through wavelength-division multiplexer (WDM) 217 to amplify the generated signal. The injected power from Raman laser 203 is measured by OPM 211 through coupler 215. The resulting signal is transmitted through fiber 205 and analyzed by OSA 207.

Experimental results from experimental setup 200 suggests that there are two approximate linear relationships between the input signal power variations and the required pump power adjustments for both forward-pumped RFA and backward-pumped RFA. (The two approximate linear relationships will be discussed.) Consequently, in accordance with an embodiment of the invention, a dynamic gain control technique for both forward-pumped distributed/discrete RFA and backward-pumped discrete RFA allows the pump power adjustments to be completed in only one step within a very short period of time (<<1 μs) while operating in an opened loop configuration. (Prior art methods based on a closed feedback loop typically need more than 3 steps to stabilize the gain.) For a forward-pumped distributed/discrete RFA, the present method allows the pump powers to be adjusted synchronously with the input signal power variation. (Prior art methods typically detect the output/backscattered signal variations and consequently require more time to stabilize the closed loop control.)

When a Raman fiber amplifier is used in a dynamic optical network, the pump power needs to be adjusted accordingly when the input signal power varies in order to maintain a constant gain. Experimental results from experimental setup 200 are indicative of a relationship between the required pump power adjustment and the input signal power variation in a forward-pumped RFA. Experimental setup 200 includes fiber facilities 205, which comprises approximately 77 km of standard single mode fiber (SSMF), which functions as the transmission fiber. Raman pump comprises Raman fiber laser 203 (1469 nm with 3 dB spectral width≅1 nm) and the signal is a narrow-band filtered ASE (amplified spontaneous emission) source (1580 nm with 3 dB spectral width≅1 nm). Both the input pump power and the input signal power are monitored by optical power meters 209 and 211 while the Raman gain is measured through OSA 207.

Figure 3:
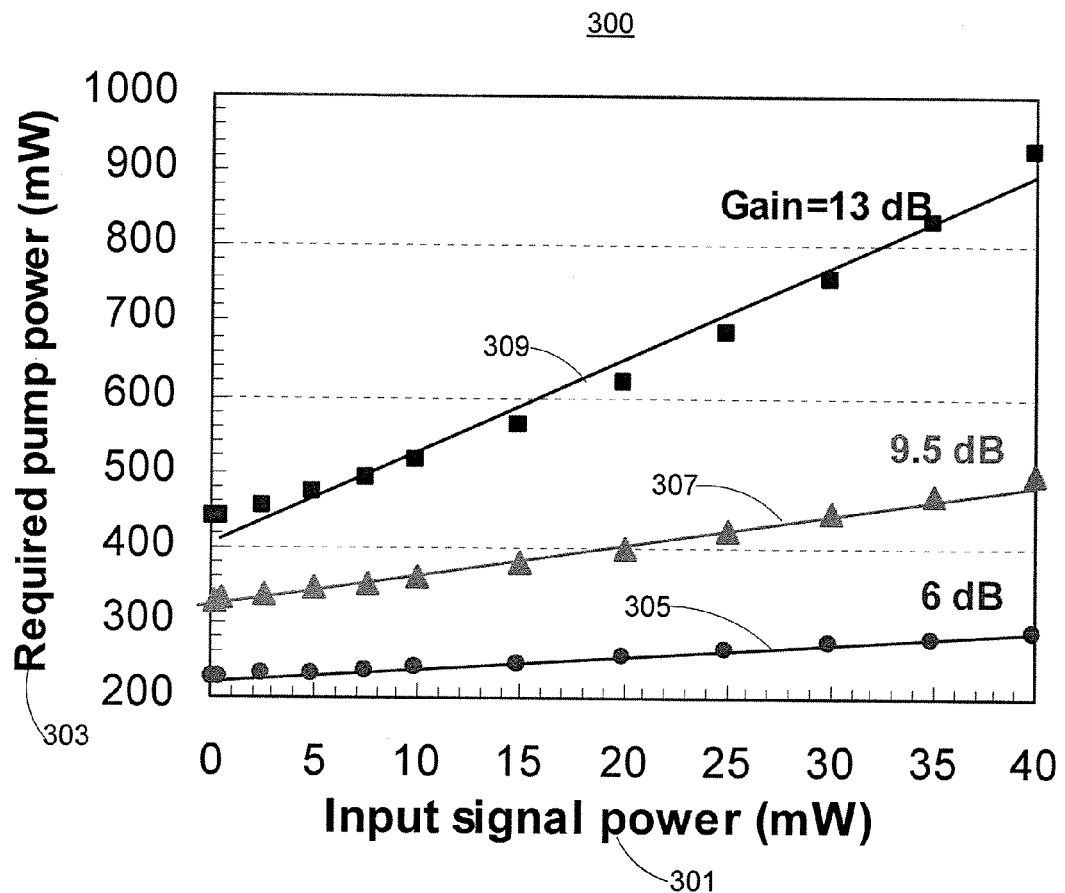
FIG. 3 shows Raman pump powers in a linear scale as a function of the input signal power in a linear scale for a forward-pumped Raman fiber amplifier in accordance with an embodiment of the invention.

FIG. 3 shows a function 300 in which Raman pump power in a linear scale is a function (relationship) of the input signal power in a linear scale for a forward-pumped Raman fiber amplifier in accordance with an embodiment of the invention. The required Raman pump power 303 as a function of the input signal power 301 (0.001 mW to 40 mW) for various target various Raman gains (6 dB, 9.5 dB and 13 dB) corresponding to plots 305, 307, and 309, respectively.

Figure 4:
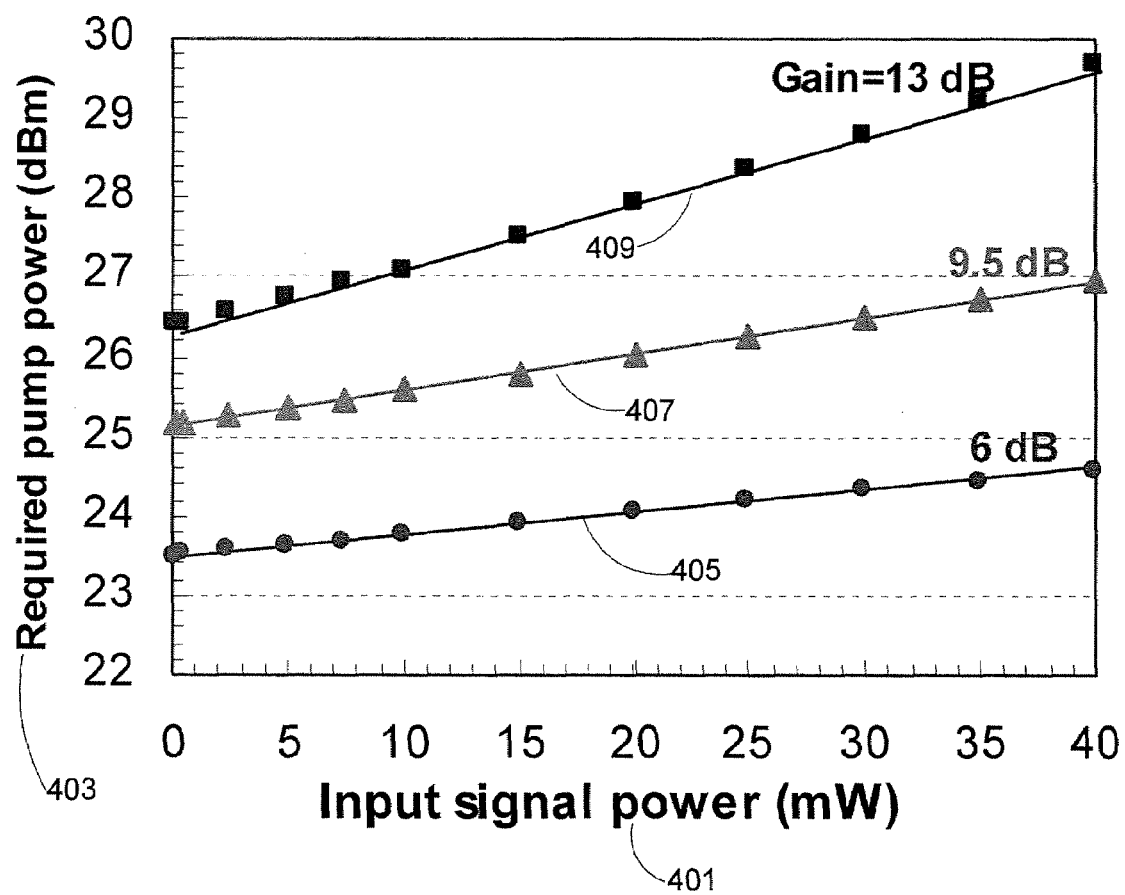
FIG. 4 shows Raman pump powers in a decibel scale as a function of the input signal power in a linear scale for a forward-pumped Raman fiber amplifier in accordance with an embodiment of the invention.

FIG. 4 shows a function 400 (that is associated with function 300 as shown in FIG. 3), in which Raman pump power 403 is shown in a decibel scale as a function of the input signal power 401 as shown in a linear scale for a forward-pumped Raman fiber amplifier in accordance with an embodiment of the invention. The required Raman pump power 403 as a function of the input signal power 401 (0.001 mW to 40 mW) for various target various Raman gains (6 dB, 9.5 dB and 13 dB) corresponding to plots 405, 407, and 409, respectively.

As shown in FIGS. 3 and 4, input signal powers 301 and 401 are shown in linear scale. One observes that the required pump power 303 is described by an approximate linear function of the input signal power 301 if the Raman gain is not substantially large as shown in FIG. 3. If one expresses the required pump power in a decibel scale (as shown in FIG. 4) while maintaining the input signal power in a linear scale, the linear relationship (corresponding to plots 405, 407, and 409) appears to hold not only for a relatively small Raman gain but also appears to hold for a relatively large Raman gain (as high as 13 dB).

In experimental setup 200 only one Raman pump and one signal are considered. However, embodiments of the invention utilize linear relationships (similar to the two linear relations as shown in FIGS. 3 and 4) for a forward-pumped RFA with multiple signals and multiple Raman pumps as long as the Raman interactions between pump and pump, between pump and signal, and between signal and signal are not too strong (the underlying reason is due to the same nature of the three Raman interactions).

In the following discussion, one assumes that there are M Raman pumps and N signal channels. In an embodiment of the invention, the N signals are partitioned into K wavelength regions. In an embodiment of the invention, one selects one of two approximate linear functions describing the relationship between the required individual pump power adjustments (relative to a reference point, e.g., half-load with uniform channel pattern) and the input signal power variations in the K wavelength regions. The two approximate linear functions (relationships) are then given by:

$$\Delta P_L(j) \approx \sum_{k=1}^{K} T_{LL}(j,k) \Delta S_L(k) \quad (\text{EQ. 1})$$

$$\Delta P_d(j) \approx \sum_{k=1}^{K} T_{dL}(j,k) \Delta S_L(k) \quad (\text{EQ. 2})$$

where $\Delta P_L(j)$, $\Delta P_d(j)$ denote the required power adjustment of the $j^{th}$ pump in linear scale and in decibel scale, respectively, and $\Delta S_L(k)$ denote the input signal power variation in linear scale in the $k^{th}$ wavelength region. For a specific target Raman gain profile, the linear coefficient $T_{LL}(j,k)$ and $T_{dL}(j,k)$ uniquely depend on the passive optical link parameters such as fiber length, fiber loss and Raman gain coefficient, and therefore can be predetermined either by direct measurement or by numerical simulation using the measured basic optical link parameters.

Numerical results suggest that EQ. 1 and EQ. 2 both hold if the target Raman gain is relatively small. With the increase of the target Raman gain it appears that EQ. 2 is preferable to describe the relationship between the required pump power adjustments and the input signal power variations, which agrees with experiments (as supported by experimental setup 200) in the case with only one pump and one signal.

Figure 5:
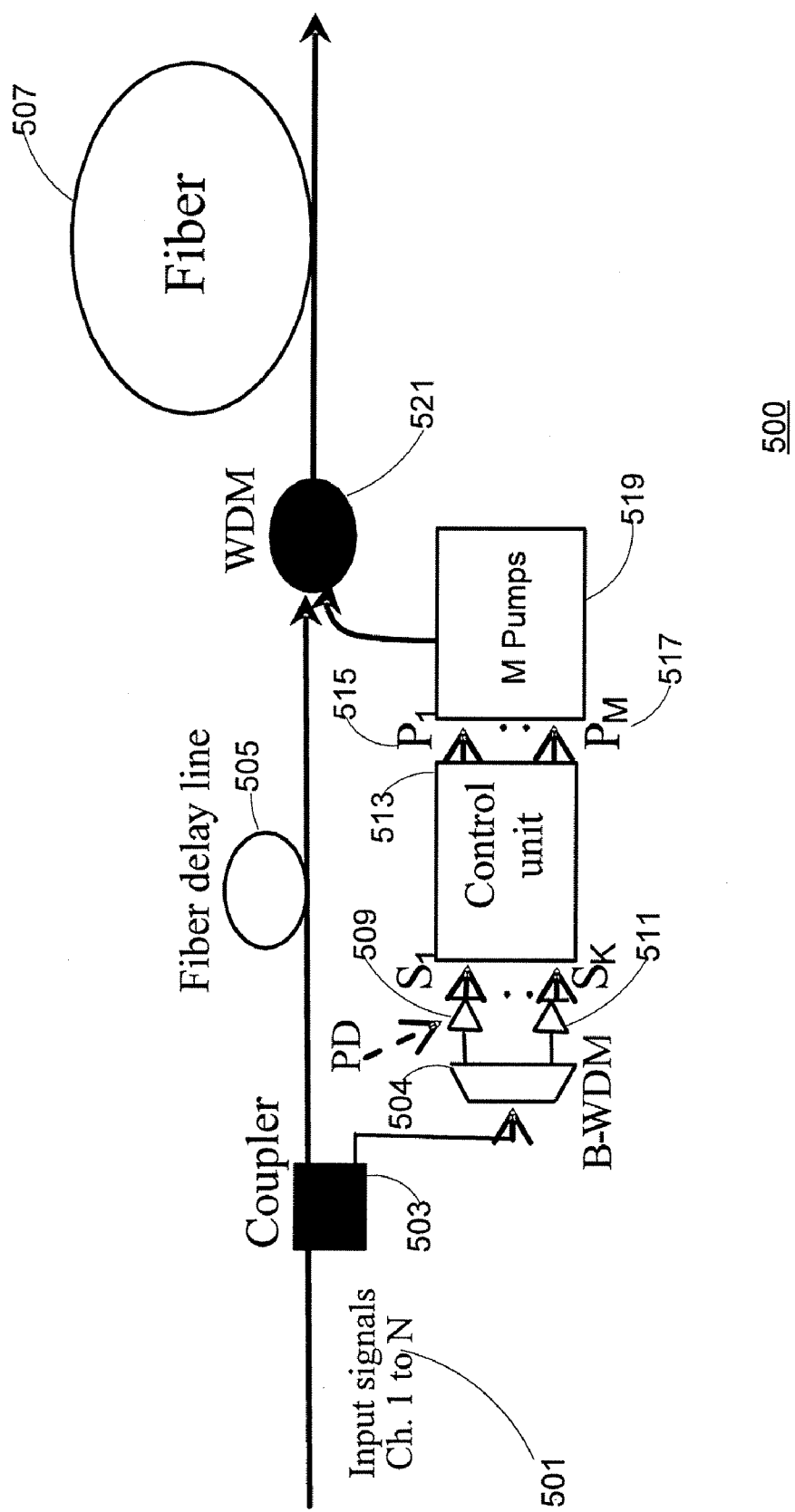
FIG. 5 shows a dynamic gain control circuit for a forward-pumped Raman fiber amplifier in accordance with an embodiment of the invention.

FIG. 5 shows a dynamic gain control circuit 500 for a forward-pumped Raman fiber amplifier in accordance with an embodiment of the invention. Dynamic gain control circuit 500 utilizes linear functions EQ. 1 or EQ. 2 as a deterministic control algorithm for a forward-pumped Raman fiber amplifier (RFA). Dynamic gain control circuit 500 comprises coupler 503, which couples input signals 501 to fiber delay line 505. A small part of the input signal power is coupled out (to monitor the input signal power variations) before it enters into the transmission fiber 507, which is partitioned into K wavelength regions by a 1×K band wavelength-division multiplexer (B-WDM) 504. (Alternatively, the embodiment may use a 1×K power splitter followed by K parallel bandpass filters.) The optical powers in the K wavelength regions (detected by K parallel photodetectors (PDs) 509-511) are used as the input parameters to control unit 513, which generates the required output pump powers 515-517 of the M Raman pumps 519 deterministically through a simple linear function calculations (either EQ. 1 or EQ. 2). Because the control algorithm (EQ. 1 or EQ. 2) is direct using an opened feedback loop configuration, the embodiment allows the pump power adjustments to be completed in only one step within a very short period of time (<<1 µs) even for a common DSP). M Raman pumps 519 inject power into transmission fiber 507 through WDM 521.

While dynamic gain control circuit 500 shows only one amplifier stage, embodiments of the invention may support a plurality of amplifier stages, each amplifier stage being geographically located along a fiber optic transmission facility and designed in accordance with EQ. 1 or EQ. 2. Each amplifier stage may include forward-pumped RFAs, backward-pumped RFAs, or a combination of forward-pumped RFAs and backward-pumped RFAs.

By introducing a short delay between the transmission branch and the control branch with fiber delay line 505, the embodiment also allows the powers of the pump to be adjusted synchronously with the input signal power. The introduced delay by fiber delay line 505 is approximately equal to the time delay introduced by de-multiplexer 504, photodiodes 509-511, control unit 513, and pumps 519. As a result, the control technique of the embodiment is typically faster (sub-µs) than control techniques supported in the prior art (sub-ms).

Linear coefficient $T_{dL}(j,k)$, which is contained in EQ. 2, may be determined by the following procedure for a 80-channel WDM system. We assume that K=2 and we use half load with uniform channel patterns (1, 3, ... 79) as the reference point. First, only input signals at channels 41, 43 to 79 are configured and the corresponding required pump power adjustment $\Delta P_d(j)$ is found. $T_{dL}(j,1)$ is then given by $\Delta P_d(j)/\Delta S_L(1)$ due to the observation that $\Delta S_L(2)=0$. Second, only input signals at channel 1, 3 and 39 are configured and corresponding required pump power adjustment $\Delta P_d(j)$ is found $T_{dL}(j,2)$ is then given by $\Delta P_d(j)/\Delta S_L(2)$ due to the observation that $\Delta S_L(1)=0$. The same process is also applicable for the case with K>2 or K=1. From FIGS. 7-14 one observes that the embodiment, as shown in FIG. 5, has the capability to suppress the Raman gain deviation of the surviving channel to be below 0.2 dB for a wide range of input signal spectral patterns. Without using gain control, however, the Raman gain deviation of the surviving channel can be as high as 2 dB with only one surviving channel and as high as −1.6 dB with full 80 channels.

Figure 6:
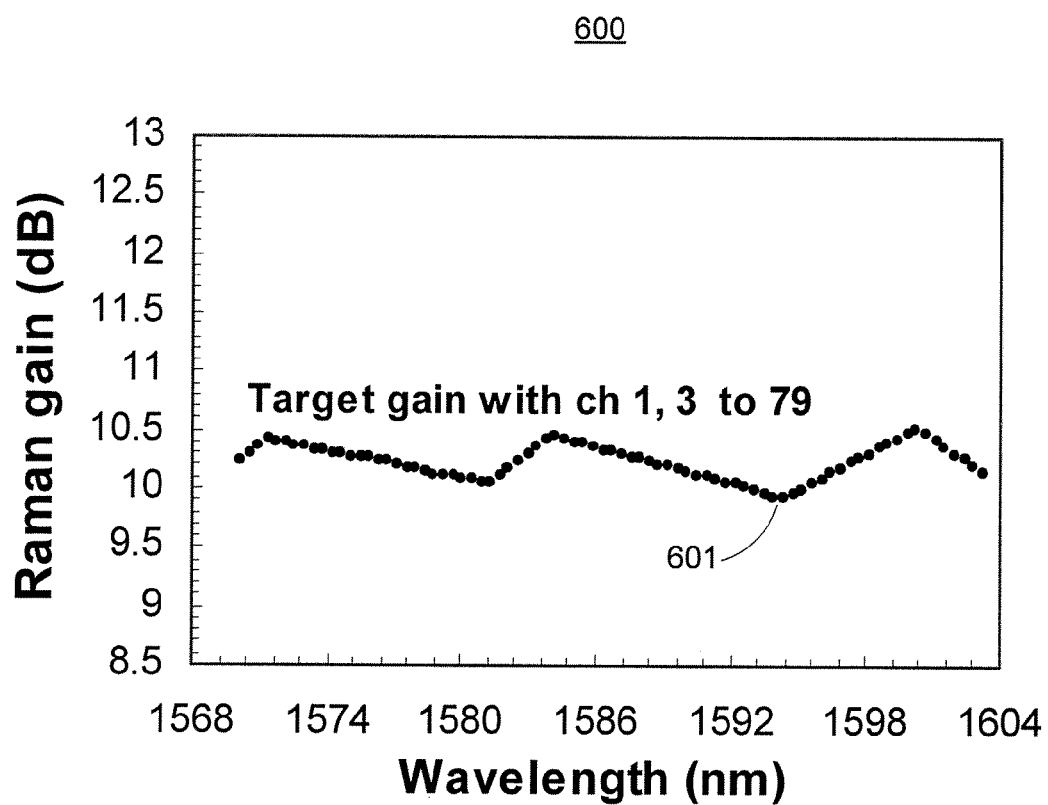
FIG. 6 shows a target Raman fiber amplifier gain profile in accordance with an embodiment of the invention.

FIG. 6 shows a target Raman fiber amplifier gain profile 600 in accordance with an embodiment of the invention. The chosen reference operation point is with half-load (40 channels) and uniform channel distribution (1,3,5, ... 79). As shown in FIG. 6, the Raman gain includes both the gain from the Raman pumps and the gain from the other signals. Choosing half load as the reference point is preferable than the commonly used reference point with full load because it allows the required maximum pump power adjustment to be reduced by half.

Figure 7:
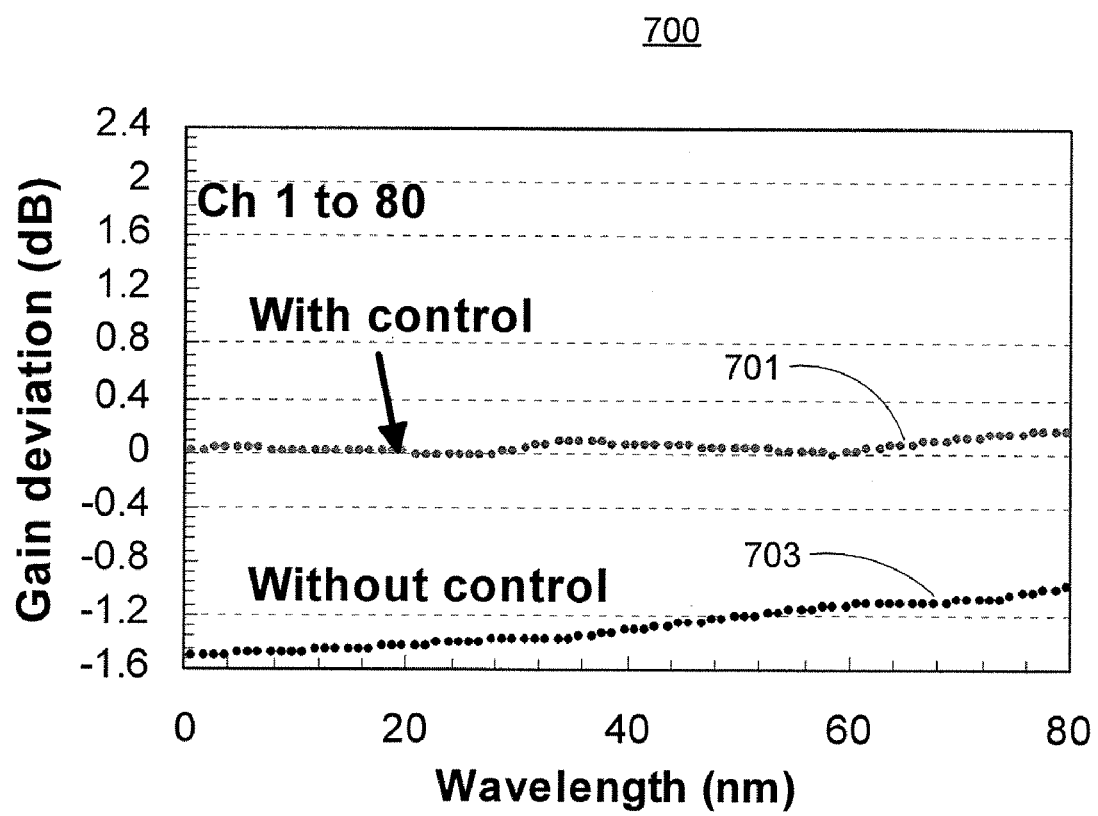
FIG. 7 shows a first example that compares gain deviation with and without dynamic gain control in accordance with an embodiment of the invention.

FIG. 7 shows a first example 700 that compares gain deviation with and without dynamic gain control with 80 active channels in accordance with an embodiment of the invention.

As previously discussed, FIGS. 7-14 (which show the simulated signal gain deviation of the surviving channel for a 50 GHz-spaced 80-channel L-band WDM system with a four-wavelength (1458, 1469, 1483 and 1503 nm) forward-pumped RFA) demonstrate the effectiveness of the embodiment shown in FIG. 5. The linear function (EQ. 2) is used as the control algorithm in the control unit. As a comparison, the signal gain deviation without gain control is also illustrated in FIGS. 7-14. 80 km of SSMF is used as the transmission fiber and the input signal power is chosen to be −3 dBm/channel. The tapped signal is divided into two wavelength regions (i.e., K=2), 1570-1584 nm, and 1584 to 1604 nm.

Figure 8:
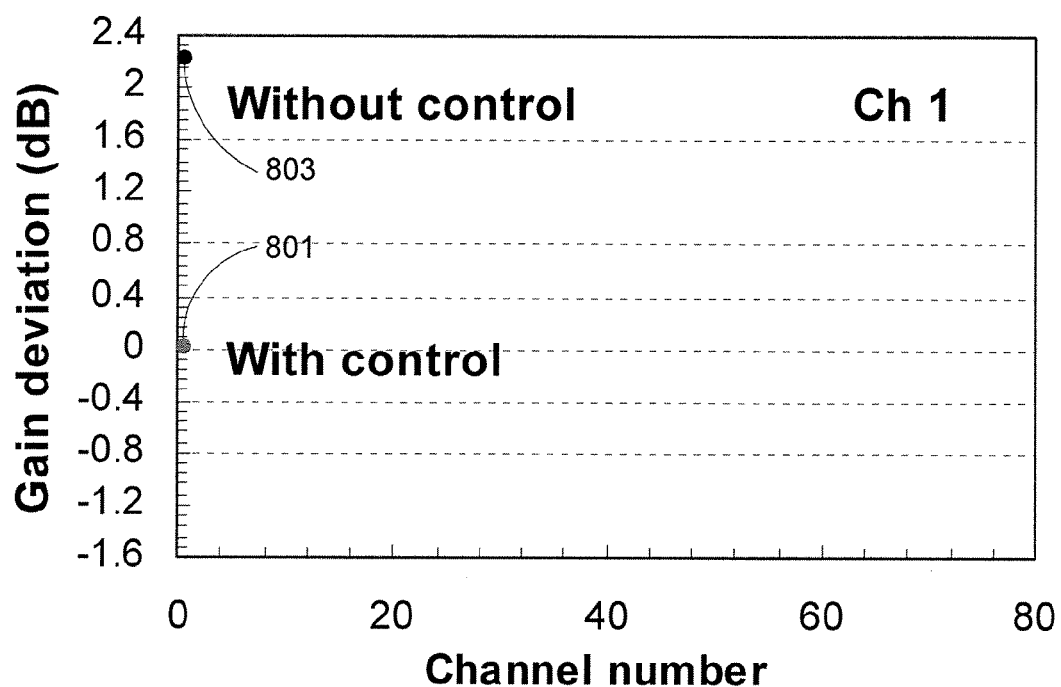
FIG. 8 shows a second example that compares gain deviation with and without dynamic gain control in accordance with an embodiment of the invention.
Figure 9:
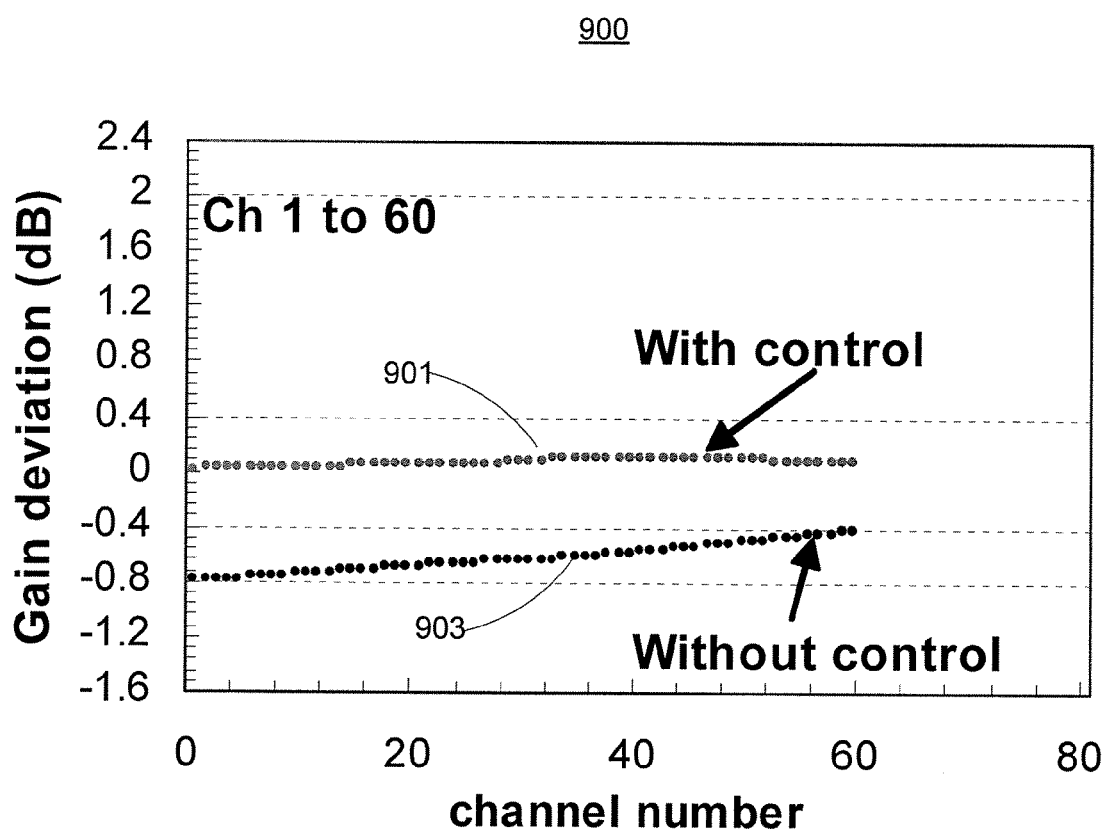
FIG. 9 shows a third example that compares gain deviation with and without dynamic gain control in accordance with an embodiment of the invention.
Figure 10:
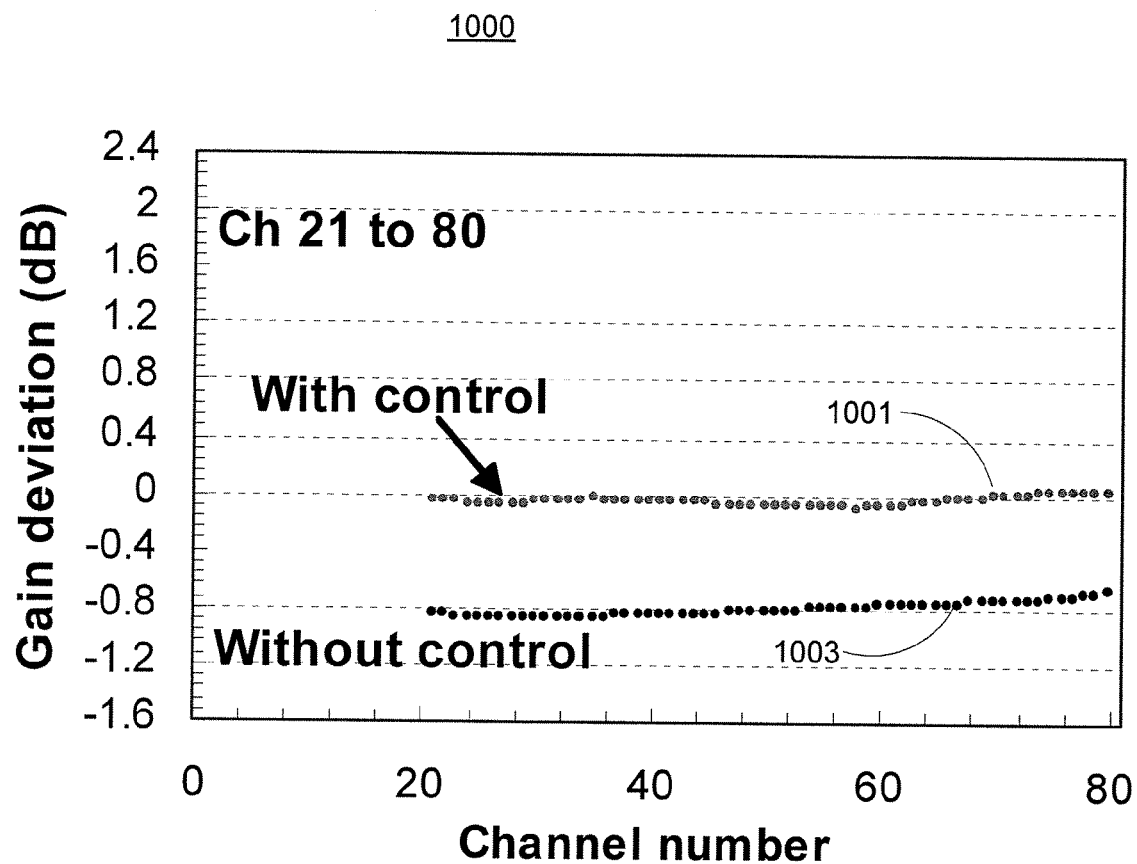
FIG. 10 shows a fourth example that compares gain deviation with and without dynamic gain control in accordance with an embodiment of the invention.
Figure 11:
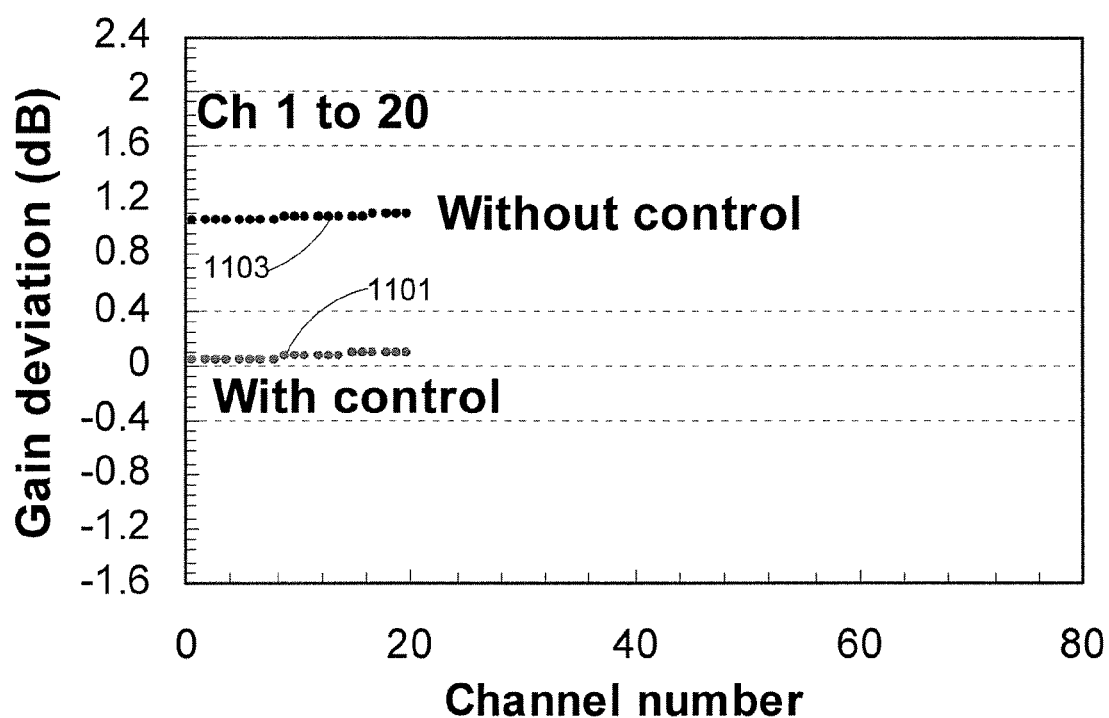
FIG. 11 shows a fifth example that compares gain deviation with and without dynamic gain control in accordance with an embodiment of the invention.
Figure 12:
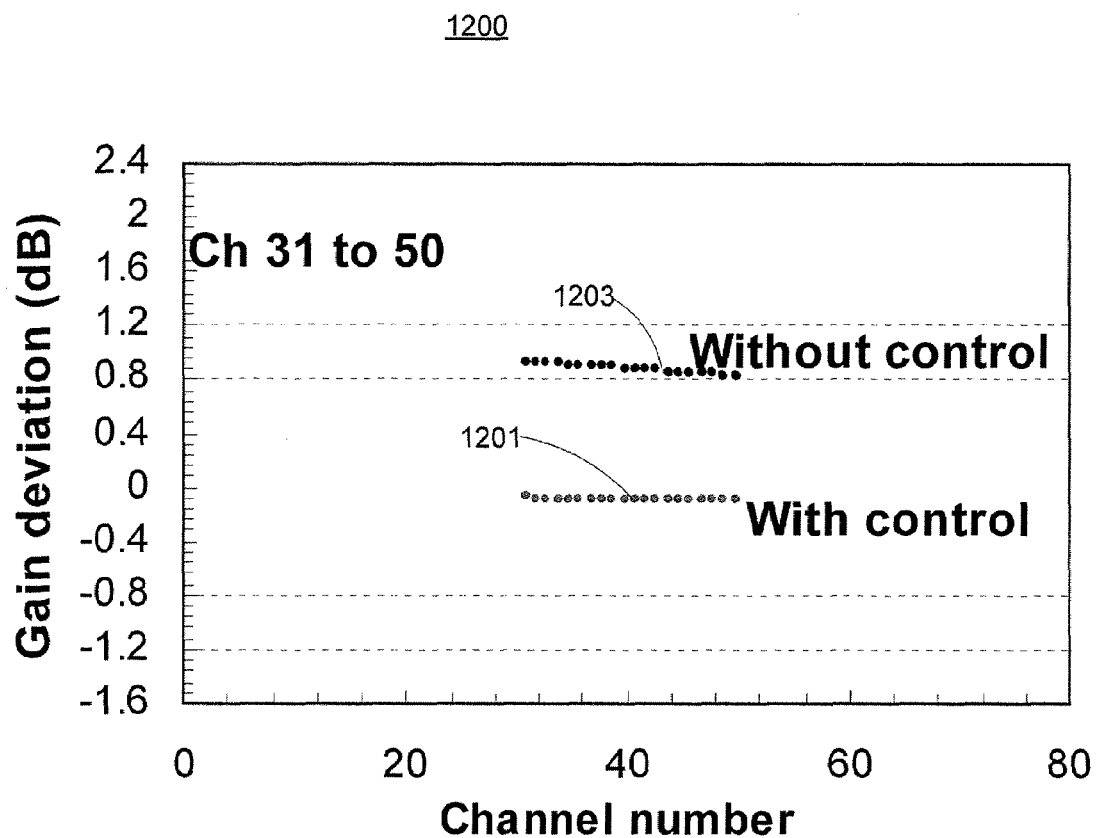
FIG. 12 shows a sixth example that compares gain deviation with and without dynamic gain control in accordance with an embodiment of the invention.
Figure 13:
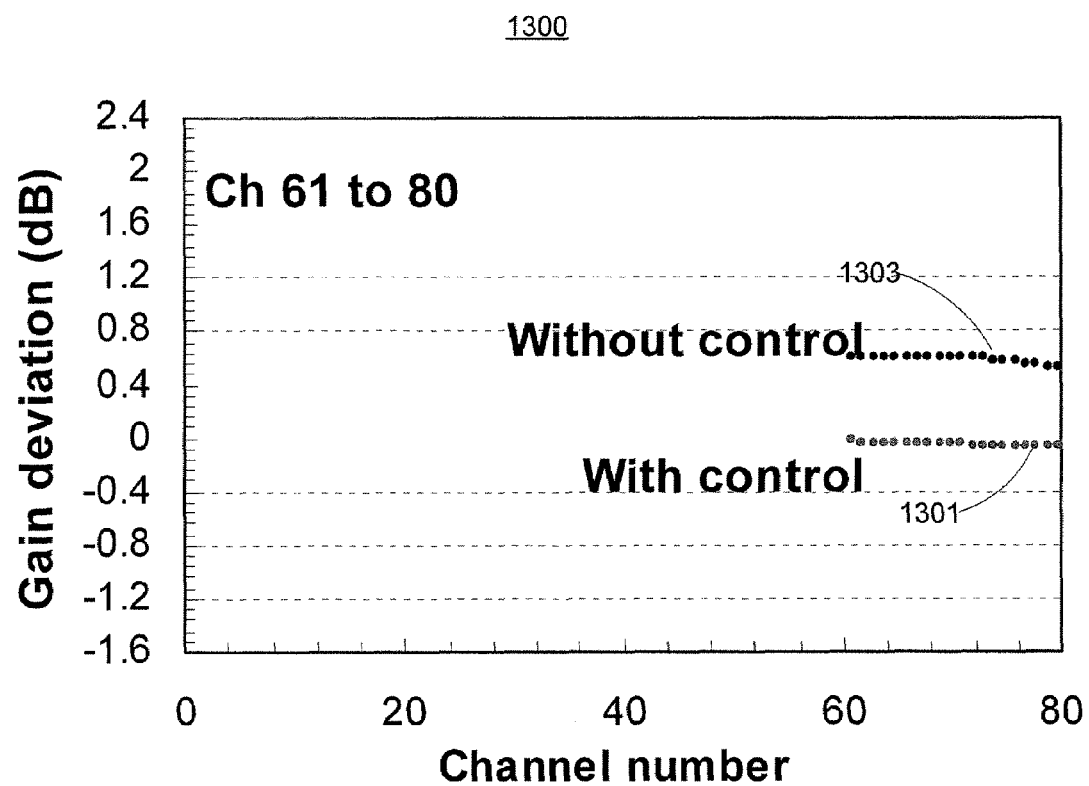
FIG. 13 shows a seventh example that compares gain deviation with and without dynamic gain control in accordance with an embodiment of the invention.
Figure 14:
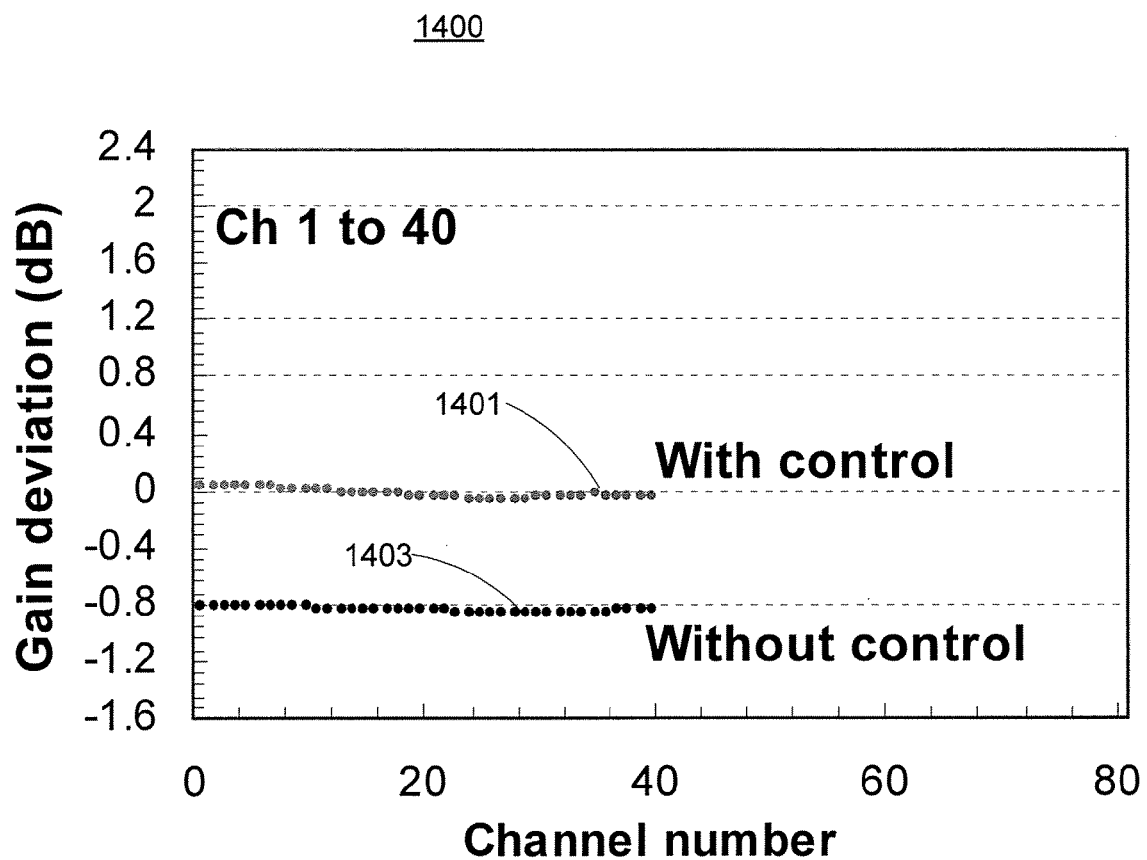
FIG. 14 shows an eighth example that compares gain deviation with and without dynamic gain control in accordance with an embodiment of the invention.

FIG. 8 shows a second example 800 that compares gain deviation with and without dynamic gain control with 1 active channel. FIG. 9 shows a third example 900 with 60 active channels. FIG. 10 shows a fourth example 1000 with channels 21-80 active. FIG. 11 shows a fifth example 1100 with 20 active channels. FIG. 12 shows a sixth example 1200 with channels 31-50 active. FIG. 13 shows a seventh example 1300 with channels 61-80 active. FIG. 14 shows an eighth example 1400 with 40 active channels. The above examples demonstrate the effectiveness of the embodiment shown in FIG. 5.

Figure 15:
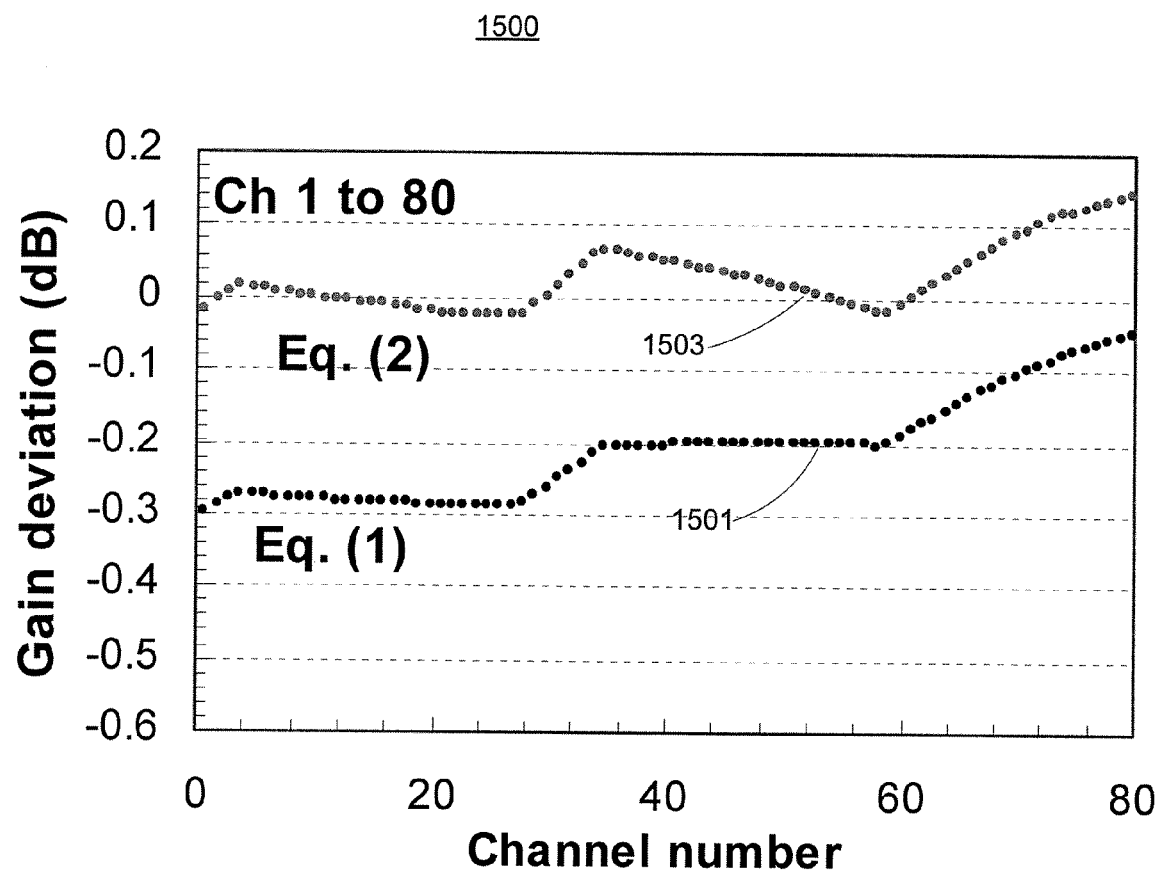
FIG. 15 shows a comparison of two control schemes in accordance with an embodiment of the invention.

FIG. 15 shows a plot 1500 comparing two control schemes with all channels (1-80) active in accordance with an embodiment of the invention. One observes that, while both schemes have the capability to suppress the signal gain deviation effectively (peak gain deviation is suppressed from −1.6 dB to 0.15 dB by using EQ. 2, and from −1.6 dB to −0.3 dB by using EQ. 1), the algorithm based on EQ. 2 appears to be better than the algorithm based on EQ. 1. This observation is due to the fact the target Raman gain (10.2±0.3 dB) is not sufficiently small. Simulations were performed to investigate the impact of K on the performance of dynamic gain control. Numerical results suggest that, for a purely L-band/C-band system, K=2 is a preferable choice, because a further increase of K only gives minor performance improvement but may increase cost considerably. On the contrary, choosing K=1 is acceptable depending on the system requirement—the peak gain deviation can be suppressed to be below 0.3 dB with K=1 while can be suppressed to be below 0.2 dB with K=2 for this specific WDM system. If one chooses K=1, the dynamic gain control circuit can be simplified with respect to apparatus 500 as shown in FIG. 5. The above investigations are based on a distributed RFA, although a similar approach is also applicable to a discrete RFA, in which only the fiber length and fiber type are different.

Figure 16:
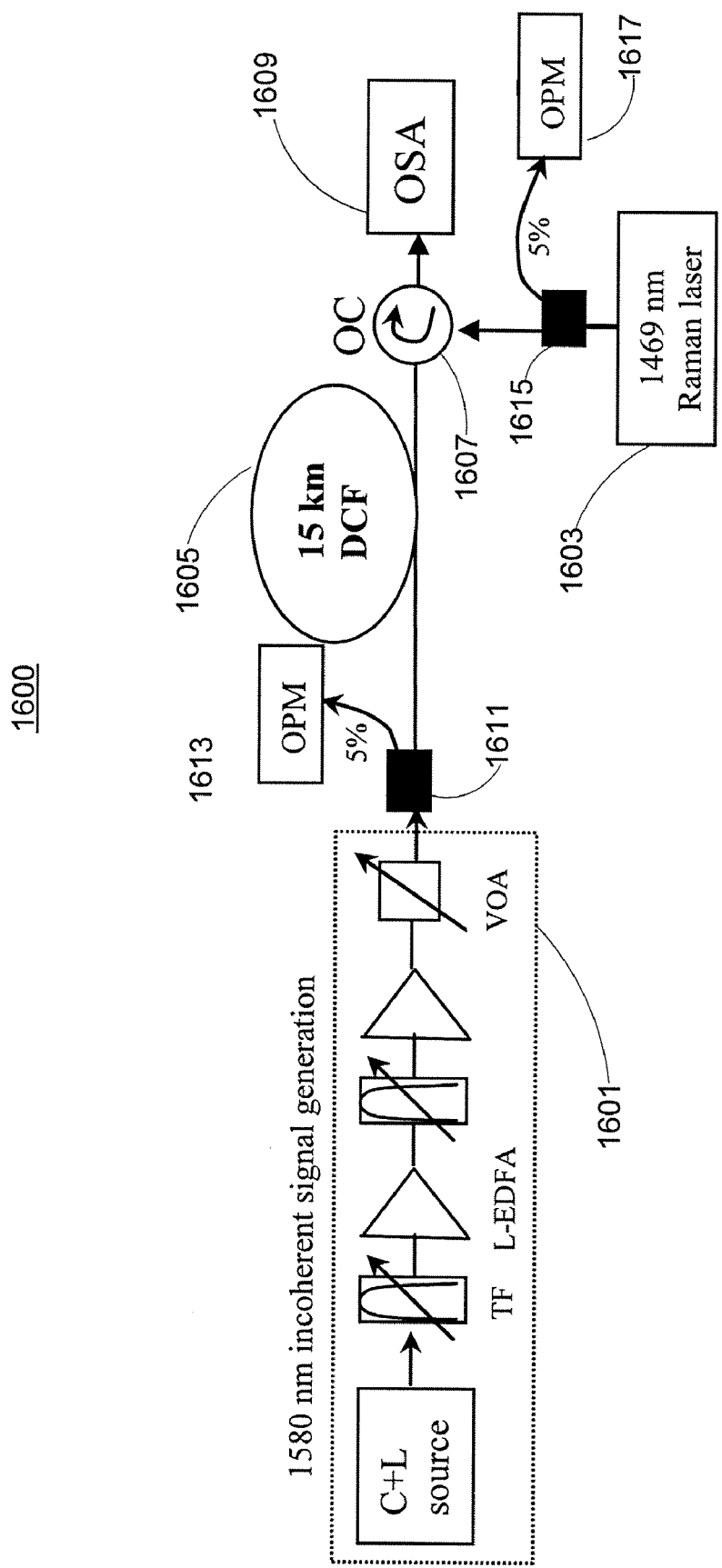
FIG. 16 shows an experimental set up for a backward-pumped Raman fiber amplifier in accordance with an embodiment of the invention.

FIG. 16 shows an experimental setup 1600 for a backward-pumped Raman fiber amplifier for investigating the relationship between the required pump power adjustment and the input signal power variation in accordance with an embodiment of the invention. Experimental results suggest a similar linear relationship (as shown in FIGS. 17 and 18) for a backward-pumped RFA as for a forward-pumped RFA (as previously discussed with FIGS. 3 and 4).

Figure 17:
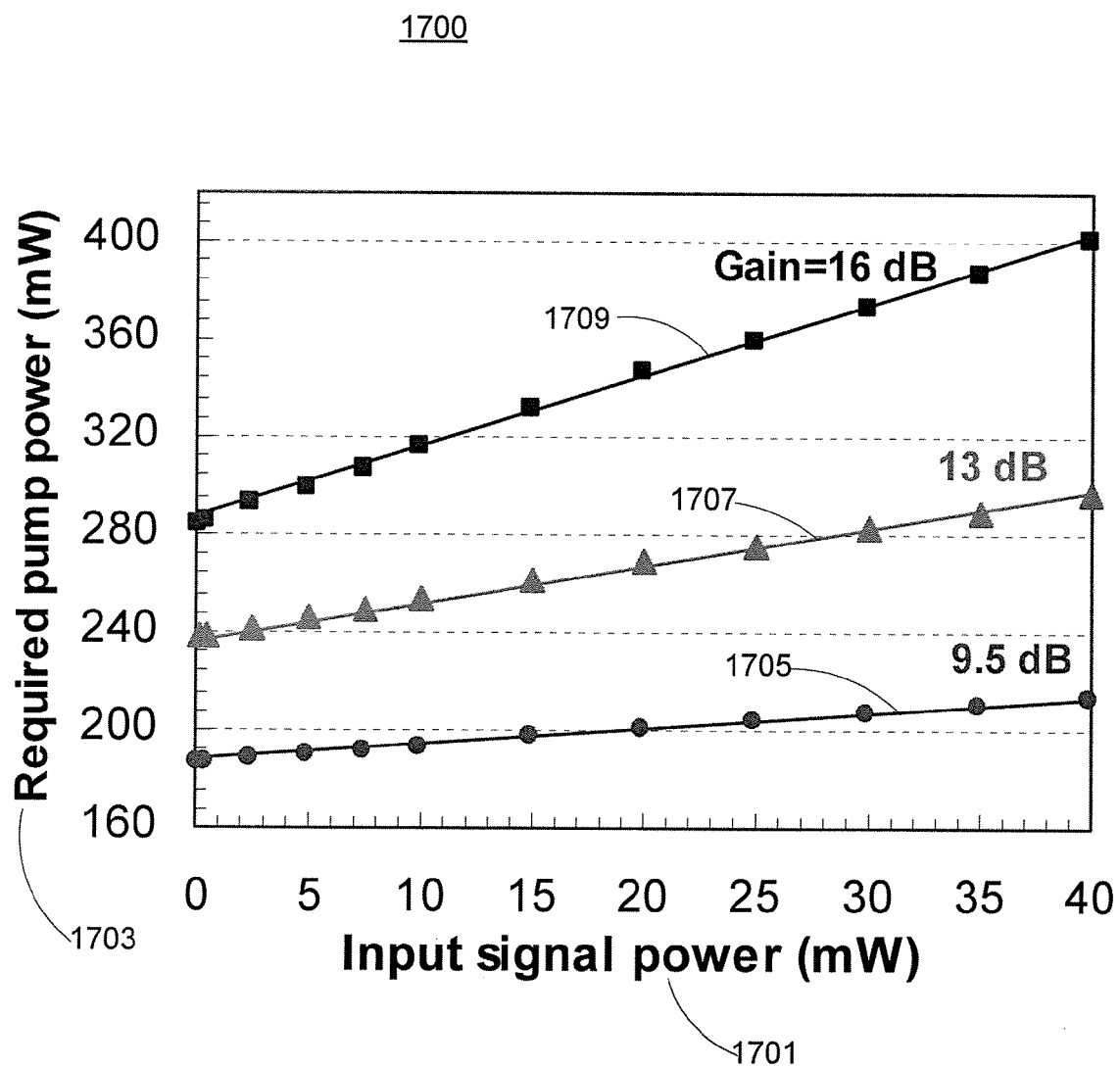
FIG. 17 shows Raman pump powers in a linear scale as a function of the input signal power in a linear scale for a backward-pumped Raman fiber amplifier in accordance with an embodiment of the invention.
Figure 18:
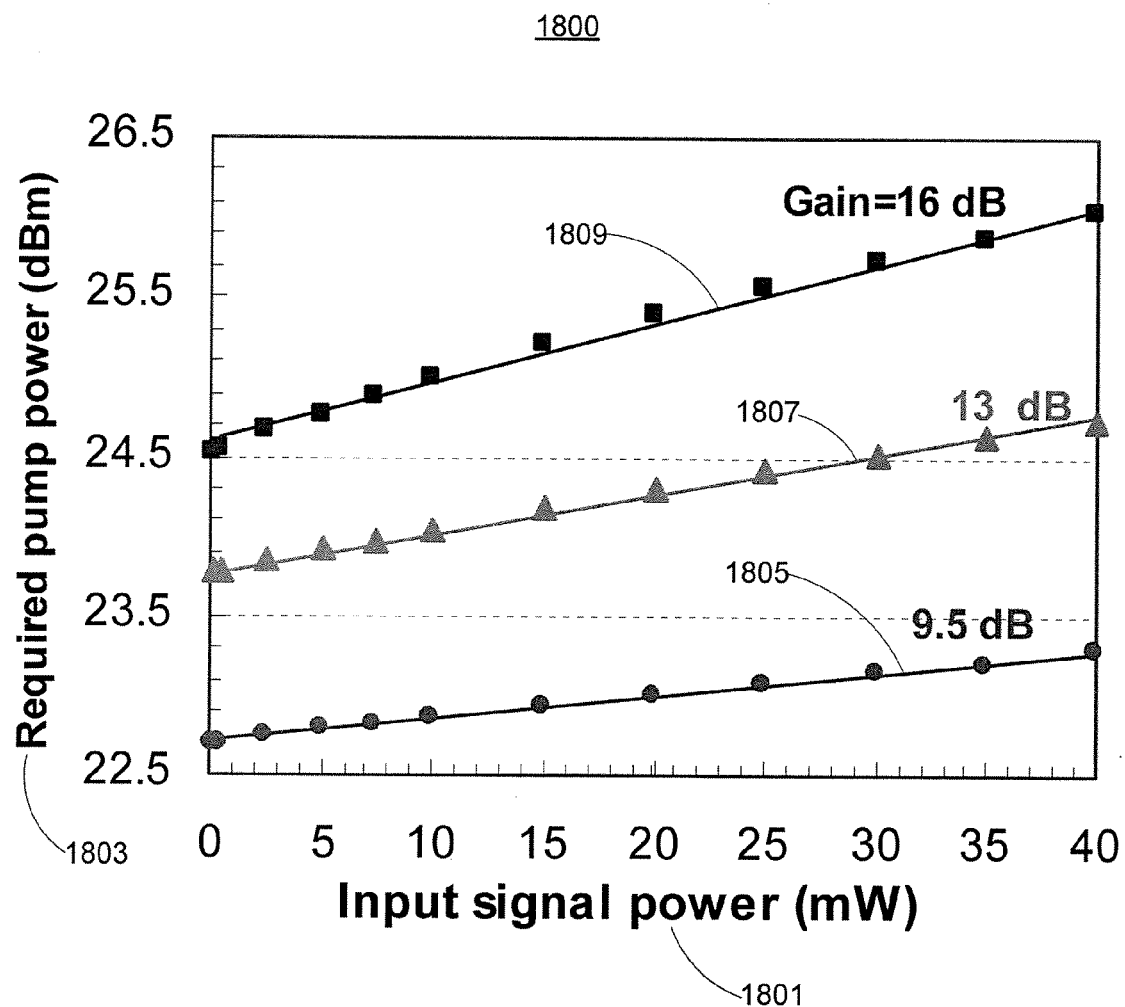
FIG. 18 shows Raman pump powers in a decibel scale as a function of the input signal power in a linear scale for a backward-pumped Raman fiber amplifier in accordance with an embodiment of the invention.

FIG. 17 shows a function 1700 in which Raman pump power in a linear scale is a function of the input signal power in a linear scale for a backward-pumped Raman fiber amplifier in accordance with an embodiment of the invention. FIG. 18 shows a function 1800 in which Raman pump power in a decibel scale is a function of the input signal power in a linear scale for a backward-pumped Raman fiber amplifier in accordance with an embodiment of the invention.

Figure 19:
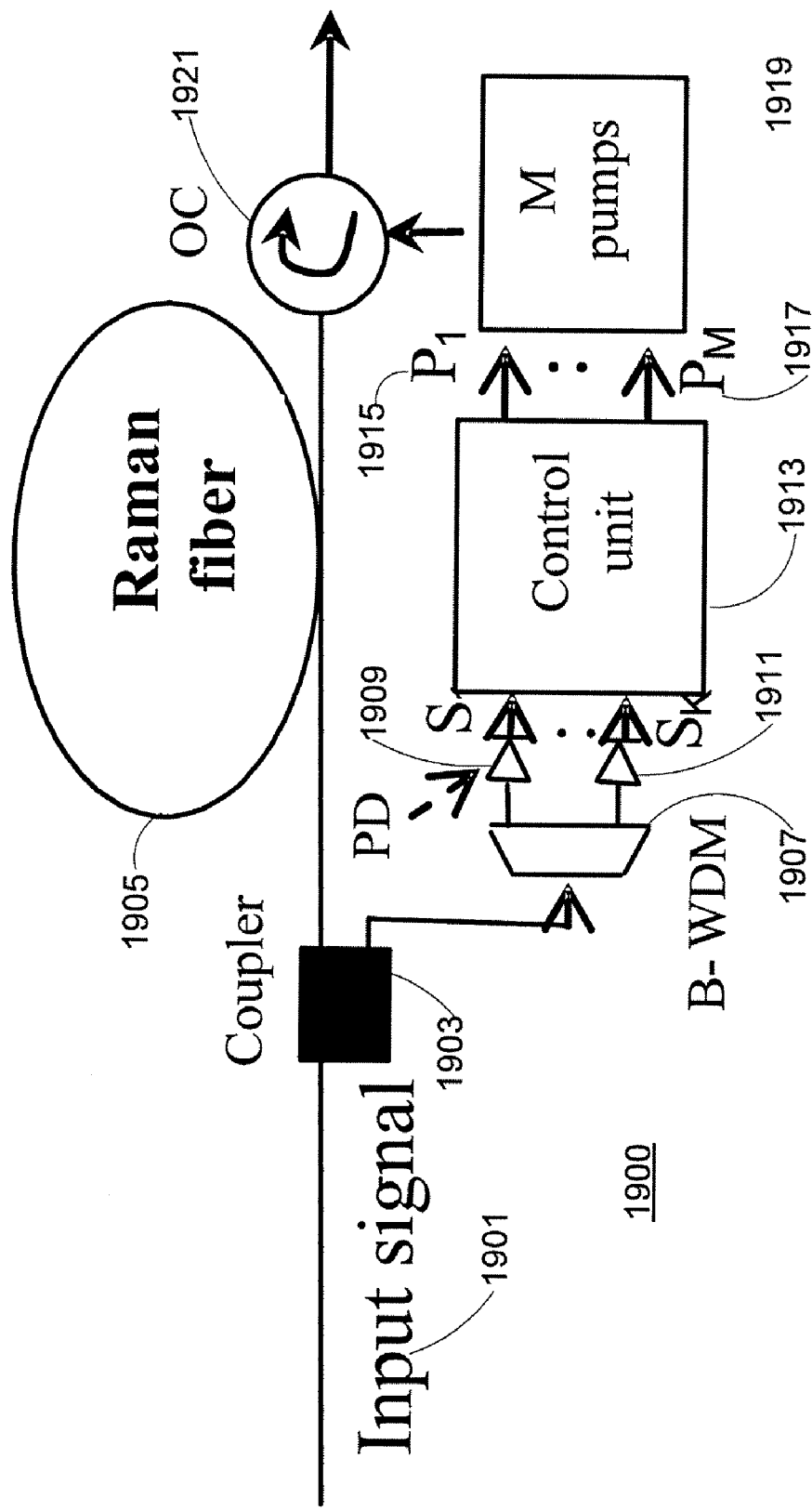
FIG. 19 shows a backward-pumped Raman fiber amplifier in accordance with an embodiment of the invention.
Figure 20:
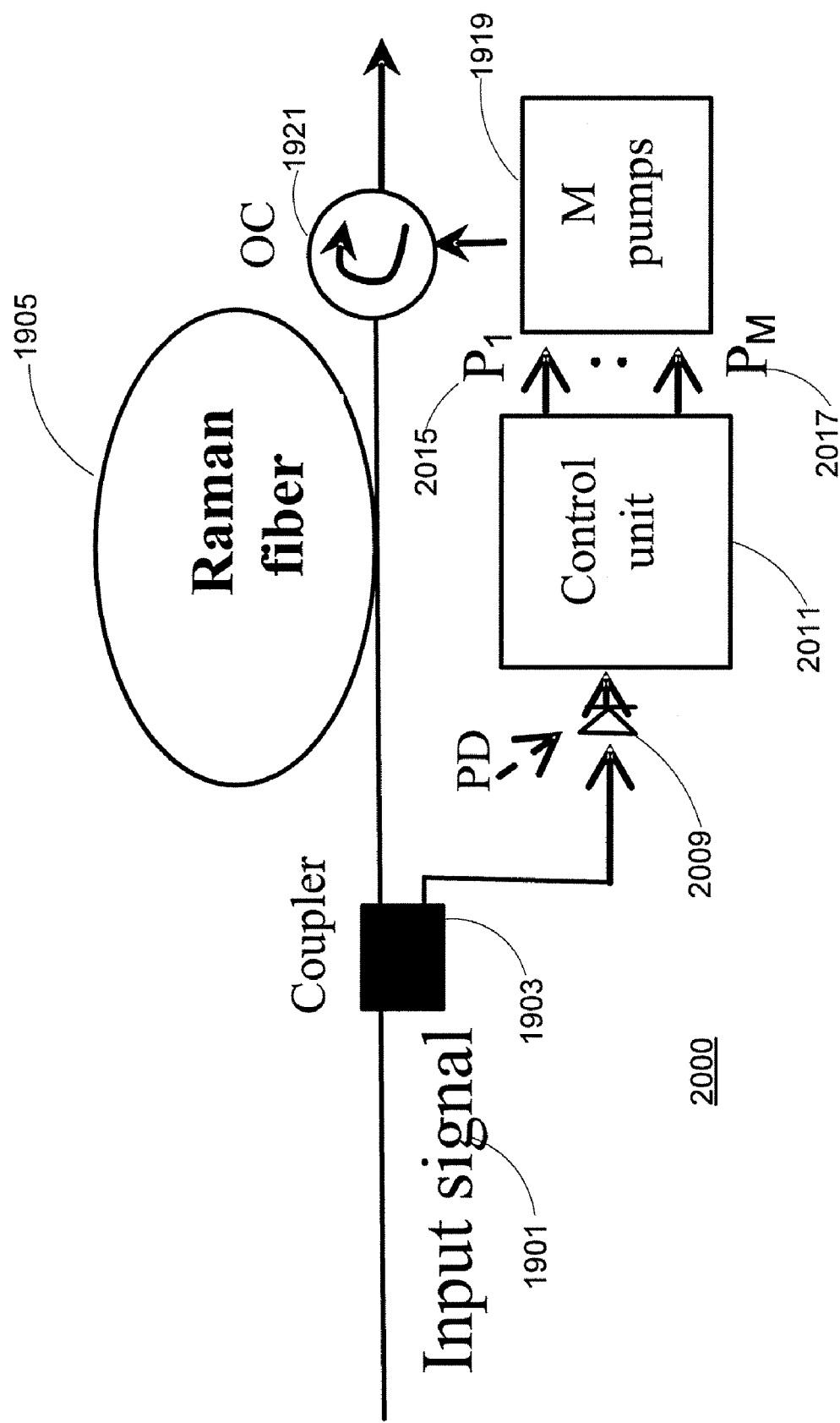
FIG. 20 shows a backward-pumped Raman fiber amplifier in accordance with an embodiment of the invention.

As with a forward pumped RFA, an embodiment of the invention utilizes one of two approximate linear relationships between the input signal power variations and the required pump power adjustments for the backward-pumped RFAs that are shown in FIGS. 19 and 20. Moreover, the linear relations are relations that are applicable to fiber systems that utilize both a forward-pumped RFA as well as a backward-pumped RFA.

Embodiments of the invention are not limited to control schemes that utilize linear functions corresponding to EQ. 1 or EQ. 2. Other complicated functions (linear or non-linear) that relate the input signal power variations directly to the required pump power adjustments are also applicable. As an example, the input signal power variations can be separated into several power regions. Within each region, linear function (EQ. 1) or (EQ. 2) is used to connect the required pump power adjustment to the input signal power variation, but the linear coefficients are allowed to be different between different power regions. A corresponding control algorithm may provide a better gain deviation suppression but at the cost of control speed and complexity.

FIG. 19 shows a backward-pumped Raman fiber amplifier 1900 in accordance with an embodiment of the invention. RFA 1900 incorporates a dynamic gain control circuit using EQ. 1 or EQ. 2 as the deterministic control algorithm for a backward-pumped discrete RFA is shown in FIG. 19. (RFA 2000 is the simplified version for the case when K=1, where the Raman fiber can be a conventional DCF or some special high nonlinear fiber.) Because a discrete RFA has much shorter fiber length than a distributed RFA, the gain transients experienced by a backward-pumped discrete RFA during channel add/drop can be significantly faster than a backward-pumped distributed RFA. Due to its deterministic nature (one-step), typically the control circuits shown in FIGS. 19 and 20 are inherently faster than the conventional methods based on a closed feedback loop, which usually needs several control cycles to stabilize the signal gain. With an embodiment of the invention, the control speed can be further improved by adding a proper electrical delay inside the control circuit to optimize the timing of the required pump power adjustment relative to the input signal power variation. As for the control algorithm, one observes that the algorithm based on EQ. 1 typically performs better than the algorithm based on EQ. 2 as illustrated by FIGS. 17 and 18. This observation is different from a forward-pumped RFA, where EQ. 2 typically performs better than EQ. 1. The underlying reason is due to the observation that pump depletion for a backward-pumped RFA occurs mostly close to the fiber end; therefore, exponential fiber loss plays a much less important role in the pump depletion than a forward-pumped Raman amplifier, in which the pump depletion occurs in a much longer fiber length.

Referring to FIG. 19, a portion the input power from input signal 1901 is provided by coupler 1903 to B-WDM 1907. Photodiodes 1909-1911 measure input power variations (PD) for each of the K wavelength regions. Control unit 1913 determines the pump power adjustments 1915-1917 using either EQ. 1 or EQ. 2. M pumps 1919 inject power into Raman fiber 1905 in the backward direction through optical circulator (OC) 1921.

Backward-pumped Raman fiber amplifier 2000, as shown in FIG. 20, is similar to backward-pumped Raman fiber amplifier 1900; however, with backward-pumped Raman fiber amplifier 2000, K=1 (i.e., there is one wavelength region). Consequently, control unit 2013 processes the input power variation (PD) for one wavelength region through photodiode 2009. Control unit 2013 controls M pumps 1919 by providing the pump power adjustments 2015-2017 to M pumps 1919.

Figure 21:
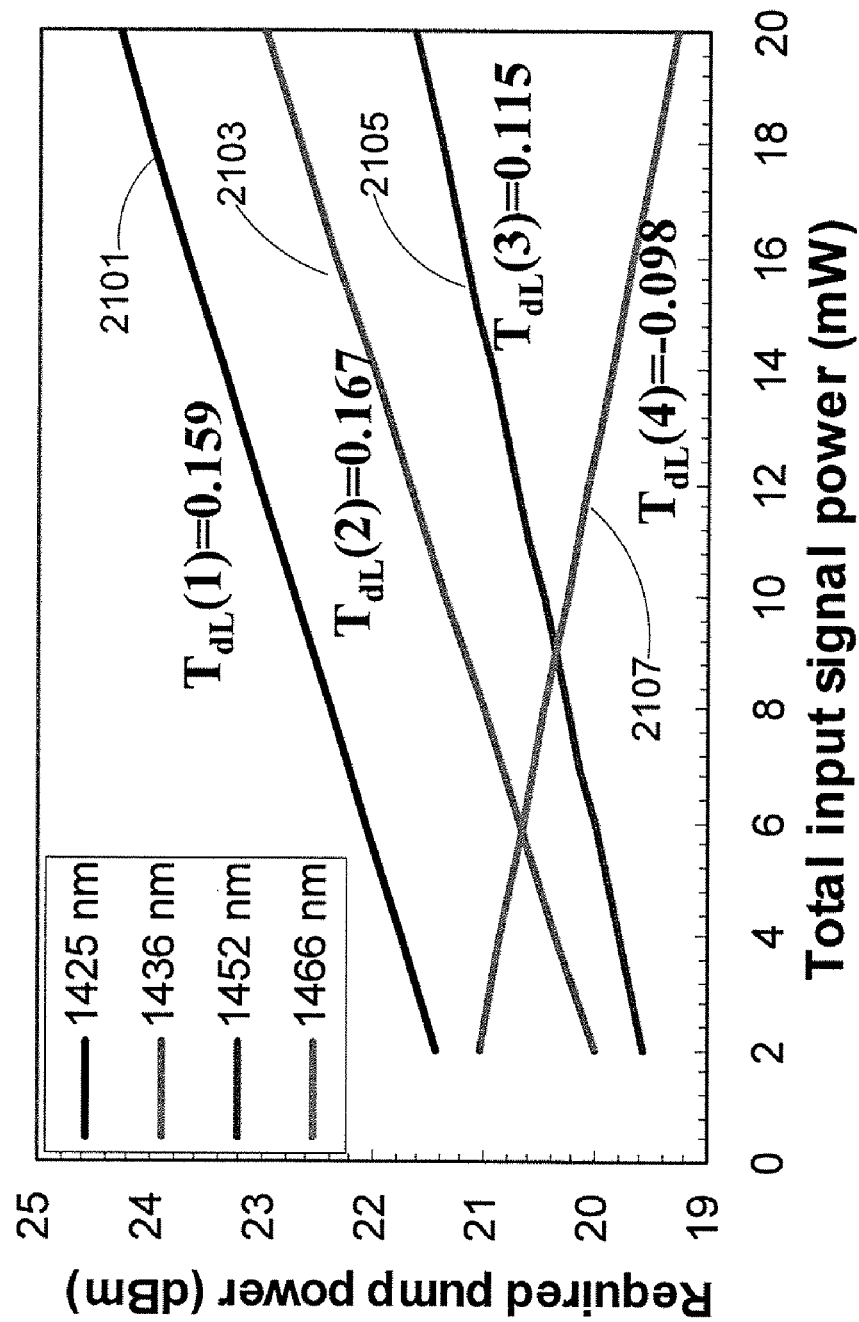
FIG. 21 illustrates an example of dynamic gain control for a forward-pumped Raman fiber amplifier in accordance with an embodiment of the invention.
Figure 22:
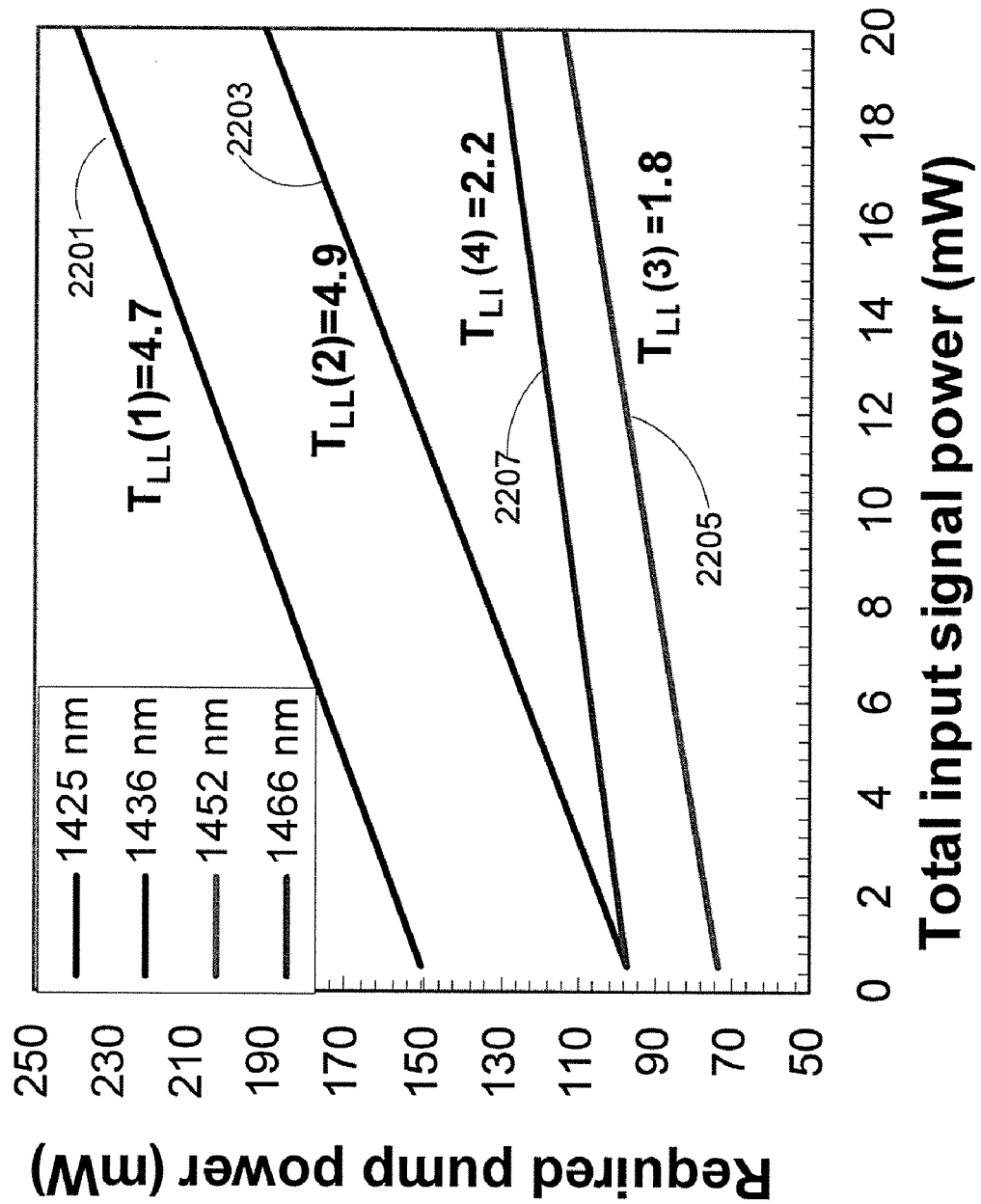
FIG. 22 illustrates an example of dynamic gain control for a backward-pumped Raman fiber amplifier in accordance with an embodiment of the invention.

FIGS. 21 and 22 provide examples that illustrate the above discussion. FIG. 21 illustrates an example of dynamic gain control for a forward-pumped Raman fiber amplifier in accordance with an embodiment of the invention. The following linear functions are used:

$$P_L(j, t) \approx P_{L0}(j) + \sum_{k=1}^{K} T_{LL}(j, k)[S_L(k, t) - S_{L0}(k)] \qquad \text{EQ. 3}$$

$$P_d(j, t) \approx P_{d0}(j) + \sum_{k=1}^{K} T_{dL}(j, k)[S_L(k, t) - S_{L0}(k)] \qquad \text{EQ. 4}$$

where $P_L(j,t)$ denotes the required pump power in the linear unit of the $j^{th}$ pump at time instant t, $S_L(k,t)$ denotes the detected input signal power in the $k^{th}$ wavelength region also in the linear unit. $S_{L0}(k)$ and $P_{L0}(j)$ denotes the corresponding input signal power and pump power at the reference operation point. The subscript L and d in EQ. 3 and EQ. 4 denote linear scale and logarithmic scale, respectively. EQ. 4 appears to be preferable for a forward-pumped Raman fiber amplifier.

In the example shown in FIG. 21, K=1, corresponding to a four-wavelength forward-pumped Raman fiber amplifier with 80 km of TW-Reach transmission fiber functions as the gain medium. The pump wavelengths are 1425, 1436, 1452 and 1466 nm. Full load (which is referred as the reference point) is configured as: 40 channel 100 GHz-spaced C-band signal, 1530 nm to 1561 nm, −3 dBm/channel input signal power, and a target Raman gain of 14±0.6 dB across the C-band.

The example utilizes the following linear control equation:

$$P_d(j,t) \approx P_{d0}(j) + T_{dL}(j)[S_L(t) - S_0] \text{ where } j=1,2,3,4 \qquad \text{EQ. 5}$$

where $P_{d0}(1)$=24.3 dBm, $P_{d0}(2)$=23.0 dBm, $P_{d0}(3)$=21.63 dBm, and $P_{d0}(4)$=19.3 dBm and $S_{L0}$=20 mW.

Referring to FIG. 21, plot 2101 corresponds to the first pump (1425 nm), plot 2103 corresponds to the second pump (1436 nm), plot 2105 corresponds to the third pump (1452 nm), and plot 2107 corresponds to the fourth pump (1466 nm). The linear coefficients $T_{dL}(1)$, $T_{dL}(2)$, $T_{dL}(3)$, and $T_{dL}(4)$ are determined to be 0.159, 0.167, 0.115, and 0.098, respectively.

FIG. 22 illustrates an example of dynamic gain control for a backward-pumped Raman fiber amplifier in accordance with an embodiment of the invention. The following dynamic control equations are used:

$$P_L(j, t) \approx P_{L0}(j) + \sum_{k=1}^{K} T_{LL}(j, k)[S_L(k, t-T) - S_{L0}(k)] \qquad \text{EQ. 6}$$

-continued $$P_d(j, t) \approx P_{d0}(j) + \sum_{k=1}^{K} T_{dL}(j, k)[S_L(k, t-T) - S_{L0}(k)] \quad \text{EQ. 7}$$

where $P_L(j,t)$ denotes the required pump power in the linear unit of the $j^{th}$ pump at time instant t, $S_L(k,t)$ denotes the detected input signal power in the $k^{th}$ wavelength region also in the linear unit. $S_{L0}(k)$ and $P_{L0}(j)$ denotes the corresponding input signal power and pump power at the reference operation point. T denotes the introduced time delay between the pump power adjustment and the input signal power variation, roughly equal to the propagation time of the signal in the fiber. The subscript L and d in EQ. 6 and EQ. 7 denote linear scale and logarithmic scale, respectively. EQ. 6 appears to be preferable for a backward-pumped Raman fiber amplifier.

In the example shown in FIG. 22, K=1. The example corresponds to a four-wavelength backward-pumped discrete Raman fiber amplifier with 12 km of dispersion compensating fiber as the gain medium. The pump wavelengths are 1425, 1436, 1452 and 1466 nm. Full load (referred as the reference point) is configured as: 40 channel 100 GHz-spaced C-band signal, 1530 to 1561 nm, −3 dBm/channel input signal power. The target Raman gain is 16±0.6 dB across the C-band.

Figure 23:
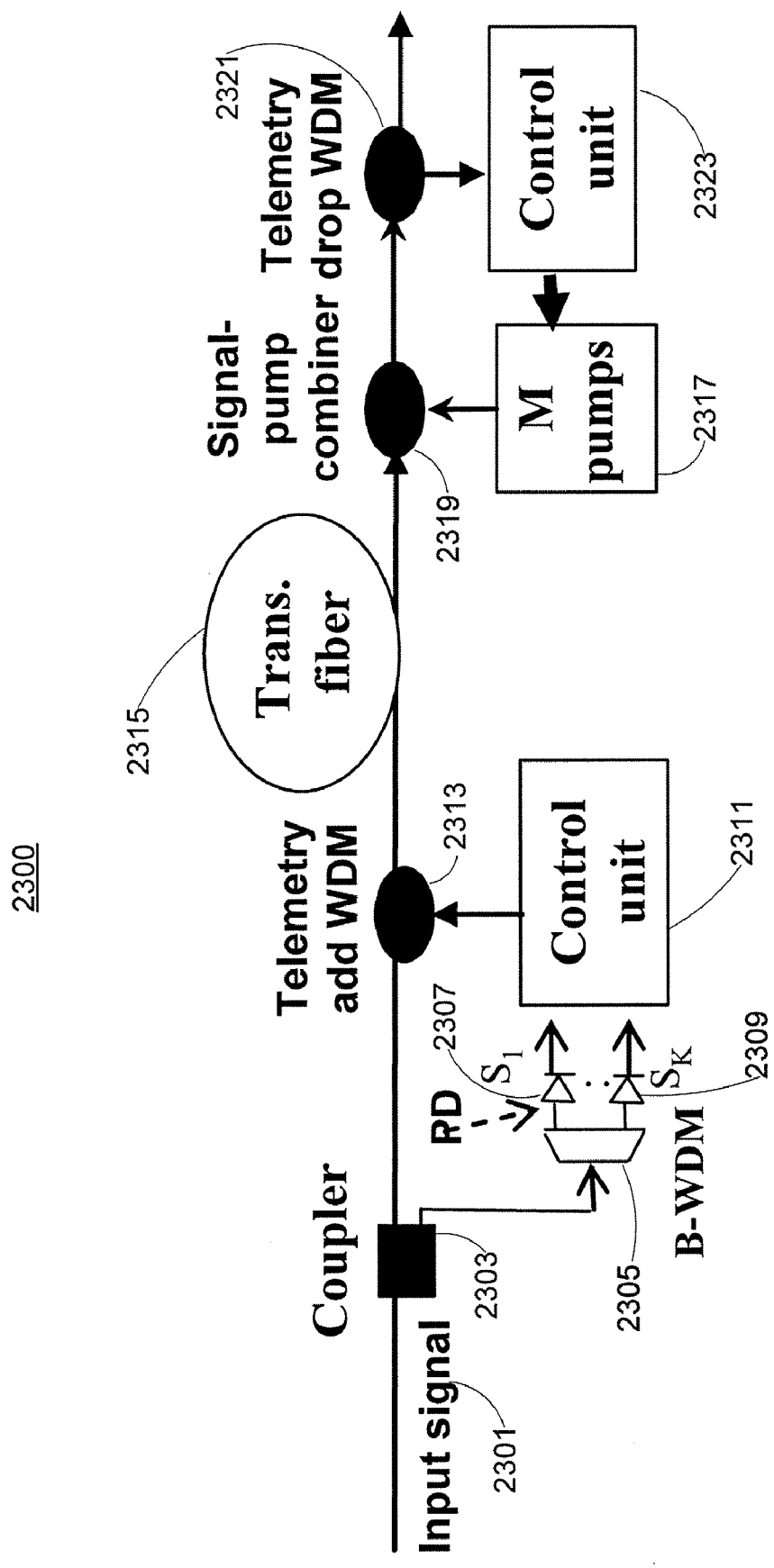
FIG. 23 shows a backward-pumped Raman fiber amplifier in accordance with an embodiment of the invention.

The example uses the following linear control equation:

$$P_L(j,t) \approx P_{L0}(j) + T_{LL}(j)[S_L(t) - S_0], j=1,2,3,4 \quad \text{EQ. 7}$$

where $P_{L0}(1)$=246 mW, $P_{L0}(2)$=197.2 mW, $P_{L0}(3)$=122 mW, and $P_{L0}(4)$=140.6 mW $S_{L0}$=20 mW FIG. 23 shows a backward-pumped Raman fiber amplifier in accordance with an embodiment of the invention. Apparatus 2300 supports a geographical separation of the detection of the input power variation (determined by coupler 2303, B-WDM 2305, photodiodes 2307-2309, control unit 2311) and the injection of power by M pumps 2317. In the embodiment shown in FIG. 23, a portion of power from input signal 2301 is coupled by coupler 2303 into B-WDM 2305 and processed by control unit 2311. Because M pumps 2317 are geographically separated from control unit 2311, control information from control unit 2311 to control unit 2323 is sent over a telemetry channel using transmission fiber 2315, WDM 2313 and WDM 2321. (Transmission fiber 2315 also supports transmission of the optical signal channels.) The telemetry channel may be the conventional optical supervisory channel that is already used in most of the commercial WDM system. Using the control information, control unit 2323 adjusts the injected power of M pumps 2317 into combiner 2319. One of the following dynamic control functions is used in designing the backward-pumped Raman amplifier shown in FIG. 23.

$$P_L(j, t) \approx P_{L0}(j) + \sum_{k=1}^{K} T_{LL}(j, k)[S_L(k, t-T) - S_{L0}(k)] \quad \text{EQ. 9}$$

$$P_d(j, t) \approx P_{d0}(j) + \sum_{k=1}^{K} T_{dL}(j, k)[S_L(k, t-T) - S_{L0}(k)] \quad \text{EQ. 10}$$

where $P_L(j,t)$ denotes the required pump power in the linear unit of the $j^{th}$ pump at time instant t, $S_L(k,t)$ denotes the detected input signal power in the $k^{th}$ wavelength region also in linear units. $S_{L0}(k)$ and $P_{L0}(j)$ denotes the corresponding input signal power and the pump power at the reference operation point. T denotes the introduced time delay between the pump power adjustment and the input signal power variation, roughly equal to the propagation time of the signal in the transmission fiber. The subscript L and d in EQ. 9 and EQ. 10 denote linear scale and logarithmic scale, respectively. EQ. 9 provides performance that is preferable for a backward-pumped Raman fiber amplifier.

Figure 24:
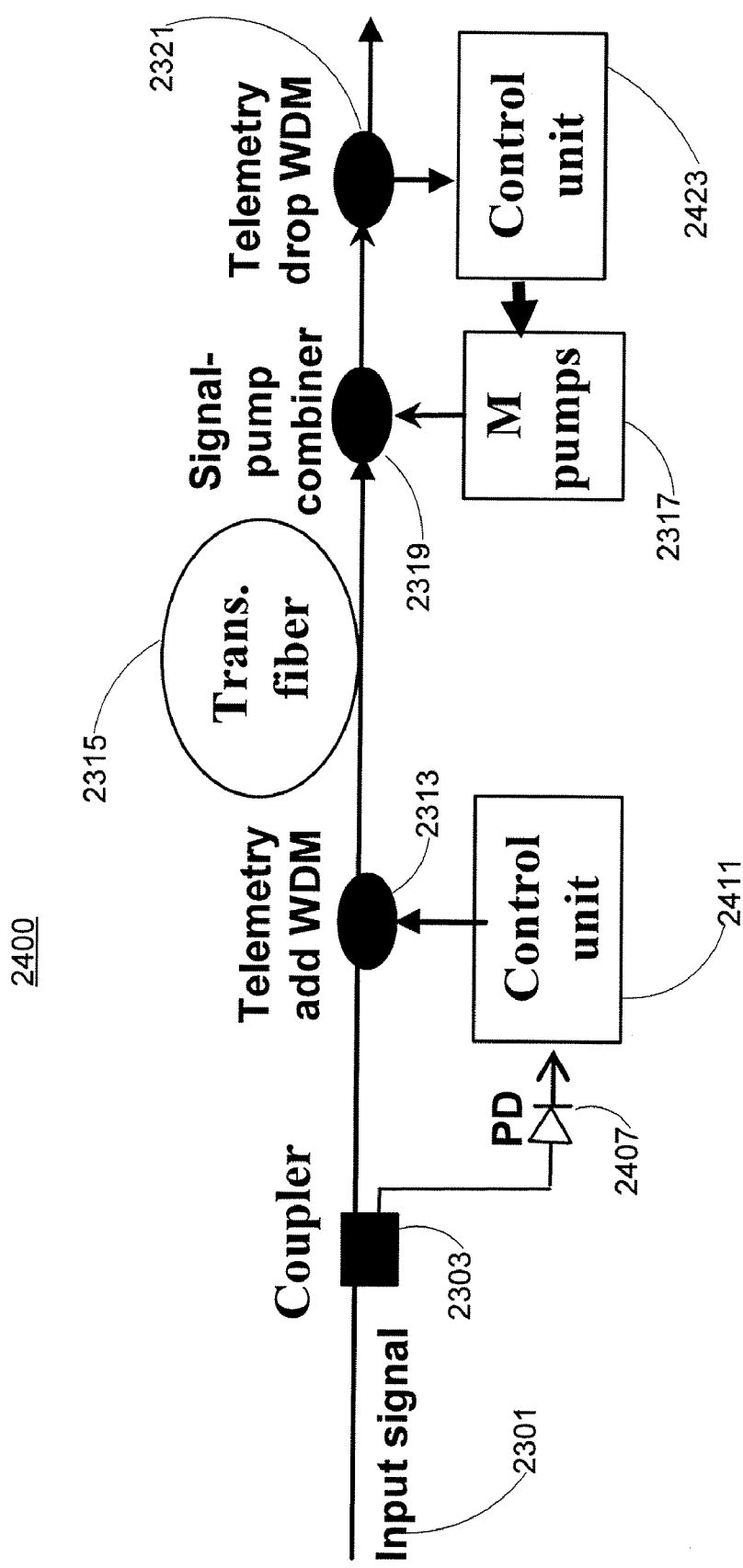
FIG. 24 shows a backward-pumped Raman fiber amplifier in accordance with an embodiment of the invention.

FIG. 24 shows a backward-pumped Raman fiber amplifier in accordance with an embodiment of the invention. Apparatus 2400 is similar to apparatus 2300; however, K=1. Consequently, only one photodiode (photodiode 2407) is needed to detect input power variations (PD). Control unit 2411 processes the detected input power variations in accordance with either EQ. 11 or EQ. 12 and sends control information to control unit 2423 over a telemetry channel on transmission fiber 2315.

$$P_L(j,t) \approx P_{L0}(j) + T_{LL}(j)[S_L(t-T) - S_{L0}] \quad \text{EQ. 11}$$

$$P_d(j,t) \approx P_{d0}(j) + T_{dL}(j)[S_L(t-T) - S_{L0}] \quad \text{EQ. 12}$$

EQ. 11 provides performance that is preferable with respect to EQ. 12 for a backward-pumped Raman fiber amplifier.

Embodiments of the invention support dynamic control of both a forward-pumped RFA and a backward-pumped RFA in an optical fiber system and Erbium doped fiber or waveguide amplifiers.

Figure 25:
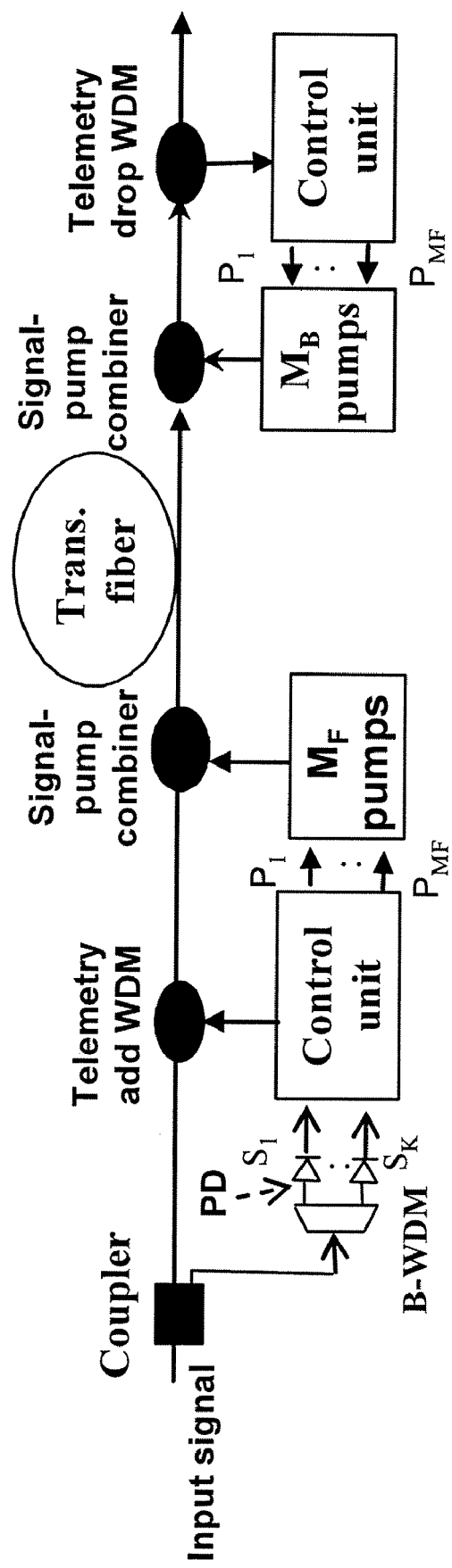
FIG. 25 shows an optical fiber system that utilizes dynamic control for both a forward-pumped Raman fiber amplifier and a backward Raman fiber amplifier in accordance with an embodiment of the invention.

FIG. 25 shows an optical fiber system that utilizes dynamic control for both a forward-pumped Raman fiber amplifier and a backward Raman fiber amplifier in accordance with an embodiment of the invention. One of the following two gain control functions is selected to control the gain of the forward-pumped Raman amplifier:

$$P_L^F(j, t) \approx P_{L0}(j) + \sum_{k=1}^{K} T_{LL}^F(j, k)[S_L(k, t) - S_{L0}(k)] \quad \text{EQ. 13}$$

$$P_d^F(j, t) \approx P_{d0}(j) + \sum_{k=1}^{K} T_{dL}^F(j, k)[S_L(k, t) - S_{L0}(k)] \quad \text{EQ. 14}$$

Additionally, one of the following two gain control functions is selected to control the gain of the backward-pumped Raman amplifier:

$$P_L^B(j, t) \approx P_{L0}^B(j) + \sum_{k=1}^{K} T_{LL}^B(j, k)[S_L(k, t-T) - S_{L0}(k)] \quad \text{EQ. 15}$$

$$P_d^B(j, t) \approx P_{d0}^B(j) + \sum_{k=1}^{K} T_{dL}^B(j, k)[S_L(k, t-T) - S_{L0}(k)] \quad \text{EQ. 16}$$

where $P_L^F(j,t)$ denotes the required pump power in the linear unit of the $j^{th}$ forward pump at time instant t, $S_L(k,t)$ denotes the detected input signal power in the $k^{th}$ wavelength region also in the linear unit. $S_{L0}(k)$ and $P_{L0}^F(j)$ denotes the corresponding input signal power and forward pump power at the reference operation point. The subscript L and d in EQ. 13, EQ. 14, EQ. 15, and EQ. 16 denote a linear scale and a logarithmic scale. The superscript F and B denote the forward Raman pump and the backward Raman pump. T is the propagation time of the optical signal in the transmission fiber. EQ. 14 is preferable for the forward-pumped Raman pumps, and EQ. 15 is preferable for the backward Raman pumps. In addition, one can use an optical supervisory channel as the telemetry channel to send the input signal power information to the backward Raman pump control unit.

For a WDM system using both forward-pumped distributed Raman fiber amplifier and backward-pumped distributed Raman fiber amplifier as discussed above, the total Raman gain comes from three different sources: from the forward Raman pumps through signal-forward Raman pump interactions, from the other signals through signal-signal Raman interactions, and from the backward Raman pumps through signal-backward Raman pump interactions. Because the typical effective Raman interaction length is smaller than 40 km and a bi-directional-pumped Raman amplifier is necessary only when the span length is large (typically greater than 80 km). This implies that the gain due to the co-propagating forward Raman pumps and the gain due to the co-propagating other signal mainly comes from the first 40 km and the Raman gain due to the backward Raman pumps mainly comes form the final 40 km. As a result, one can treat a bidirectional-pumped distributed Raman amplifier as two separate amplifiers: a forward-pumped Raman amplifier followed by a backward-pumped Raman amplifier. The control equations EQ. 13 or EQ. 14 is used to control fast gain transient (sub-us) due to co-propagating signal-forward pump interactions and signal-signal Raman interactions while the control equation EQ. 15 and EQ. 16 is used to control relatively slow gain transient (sub-ms) due to signal-backward pump interactions. The control coefficients for both the forward-pumped Raman amplifier and the backward-pumped Raman amplifier can be predetermined either by numerical calculation using the measured basic fiber link parameters or by direct measurement using K predetermined input channel patterns as follows. First, one disables all the backward Raman pumps. For each of the K input patterns, one calculates or measures the required power adjustments of each of the $M_F$ forward Raman pumps based on a target forward Raman gain profile (include both the gain from the forward Raman pumps and the gain from the signal-signal Raman interaction). The sets of control coefficients for the forward-pumped Raman amplifier can then be obtained by substituting the measured individual forward pump power adjustments in accordance with the K channel patterns into EQ. 13 or EQ. 14. Second, one turns on both the forward Raman pumps and the backward Raman pumps. For each of the K channel patterns, one first adjusts the forward pump powers (already known from the first step), and then one measures the required power adjustment of each of the $M_B$ backward Raman pumps based on the total target Raman gain profile which includes the gain from the forward Raman pumps, from the signal-signal Raman interaction and from the backward Raman pumps. Substituting the measured individual backward pump power adjustments in accordance with the K channel patterns into EQ. 15 or EQ. 16, one then obtains the sets of control coefficients for the backward-pumped Raman amplifier.

Figure 26:
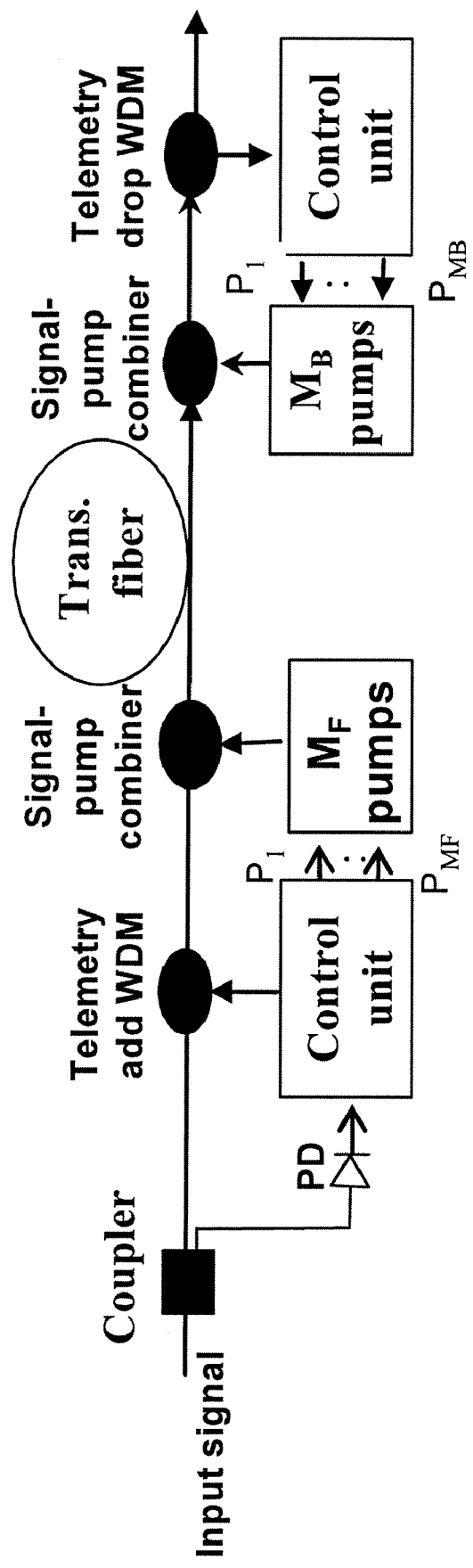
FIG. 26 shows an optical fiber system that utilizes dynamic control for both a forward-pumped Raman fiber amplifier and a backward Raman fiber amplifier in accordance with an embodiment of the invention.

FIG. 26 shows an optical fiber system that utilizes dynamic control for both a forward-pumped Raman fiber amplifier and a backward Raman fiber amplifier in accordance with an embodiment of the invention. The optical fiber system is similar to the optical fiber system as shown in FIG. 25; however, the number of wavelength regions is one (i.e., K=1).

Distributed Raman fiber amplification has been proven to be a powerful technique to improve the optical signal to noise ratio (OSNR) margin of long haul WDM systems, and has enabled dramatic increases in the capacity and reach of optical fiber communication systems. A Raman amplifier can be configured as a backward-pumped Raman fiber amplifier, a forward-pumped RFA or a bi-directionally pumped RFA. It has been shown that a bi-directionally-pumped RFA can achieve better noise and Rayleigh crosstalk performance than a purely backward-pumped/forward-pumped RFA, and therefore enable very long span transmission. Research suggests that a bi-directionally-pumped all-Raman system allows the repeater spacing to be doubled (from current 80 km per span to 160 km per span, reducing amplifier huts and therefore real estate expense by half) while achieving comparable performance of current 80 km per span EDFA systems for post-1998 standard single mode fiber (SSMF). On the other hand, optical communication is evolving from current point-to-point systems to dynamic optical networks. In a dynamic optical network, channels will be added and dropped to meet the varying capacity demands. In addition, accidental loss of channels due to fiber cut or amplifier failure will also lead to variations of the overall optical power in the transmission system. To keep the power of the surviving channels at a constant level, fast dynamic gain profile control is indispensable for both EDFA and RFA.

In an embodiment of the invention, control of an overall gain for multiple cascaded RFAs is supported. The multiple cascaded RFAs may be independent (i.e., no interaction) or dependent (with interaction). In accordance with the present invention, the overall gain (including the gain from both signal-pump and signal-signal Raman interactions) may be controlled by adjusting the pump powers of only one RFA with the proposed linear/log-linear feed-forward control algorithm. The overall gain may also be controlled by adjusting the pump powers of multiple RFAs but using only one monitor (the same feed-forward signal is shared by multiple RFAs). Experimentation suggests the effectiveness of an embodiment in a 40 channel-100 GHz spaced C-band WDM system using a four-wavelength forward-pumped RFA and a two-wavelength backward-pumped RFA in the same transmission fiber (corresponding to two cascaded RFAs with interaction).

Experimentation suggests that simply by adjusting the pump powers of the four forward Raman pumps using the proposed log-linear feed-forward control algorithm, the overall gain may be stabilized for 26 distinctive drop patterns and three different gain profiles by only monitoring the total input signal power. Experimental results will be further discussed.

Figure 27:
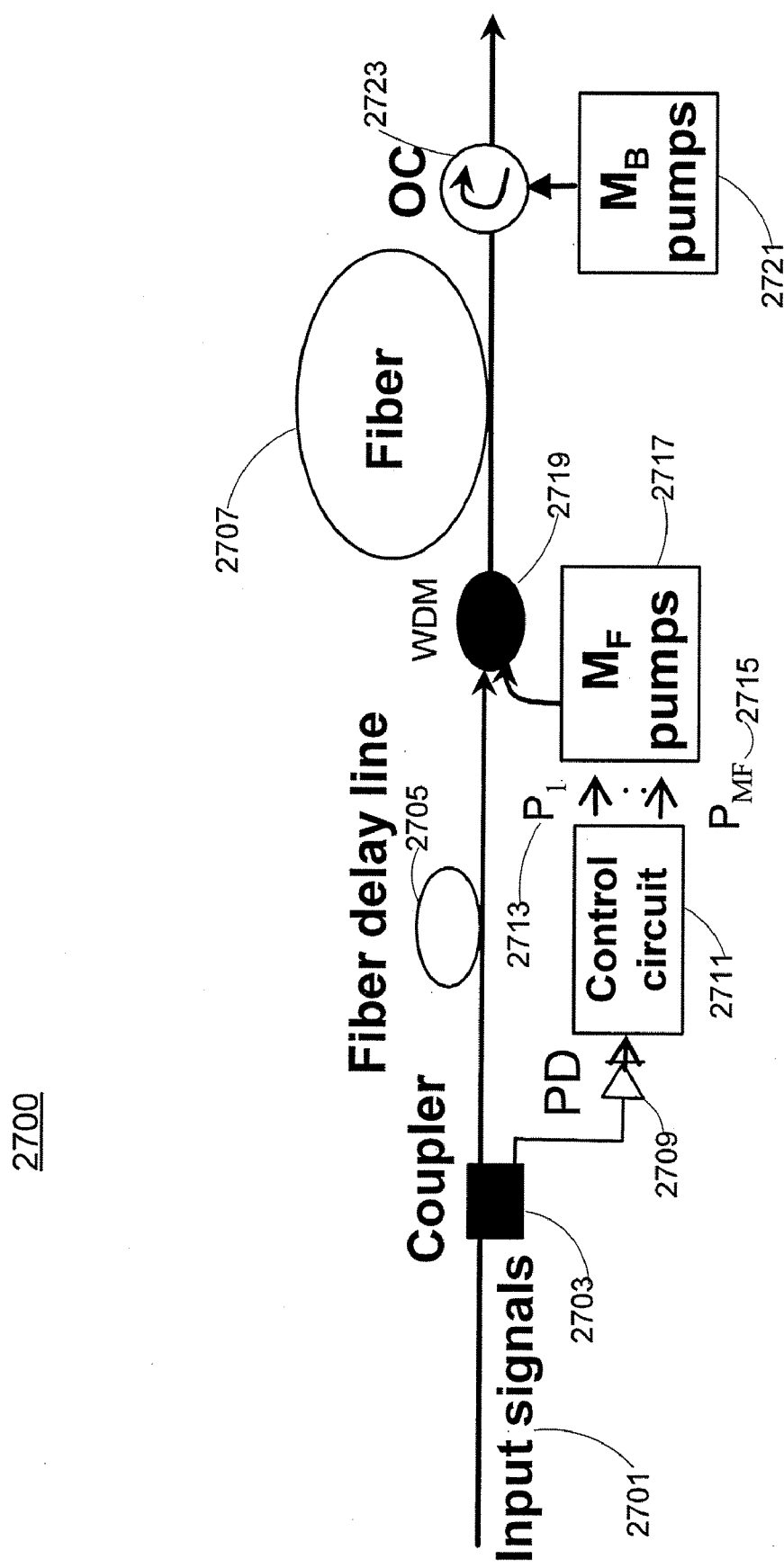
FIG. 27 shows an apparatus for controlling a bidirectionally-pumped Raman amplifier in accordance with an embodiment of the invention.

FIG. 27 shows an apparatus 2700 for controlling a bidirectionally-pumped Raman amplifier in accordance with an embodiment of the invention. FIG. 27 includes a bidirectionally-pumped RFA with $M_F$ forward Raman pumps 2717 and $M_B$ backward Raman pumps 2721. Apparatus 2700 transmits optical signal channels (input signals) 2701 over transmission fiber 2707. The forward Raman pump powers are fed into transmission fiber 2707 through a pump-signal wavelength division multiplexer (WDM) 2719 while the backward Raman pump powers are fed into the transmission fiber through optical circulator 2723. A portion (e.g., 5%) of the total input signal power is coupled through coupler 2703 and detected by photodiode 2709. The detected signal from photodiode 2709 is used as the input of the control and decision circuit 2711. Fiber delay line 2705 has similar functionality as fiber delay line 505 as previously discussed with FIG. 5.

Control and decision circuit 2711 determines required individual pump power adjustments $P_1$ 2713 through $P_M$ 2715 (relative to a reference operational point, such as the point of full load) through a log-linear relationship as $$\Delta P_d(j) \approx T_d(j) \Delta S_L \qquad \text{EQ. 17}$$

where $\Delta P_d(j)$ denotes the required power adjustment of the $j^{th}$ pump in log scale and $\Delta S_L$ denotes the detected total input signal power variation in linear scale. $T_d(j)$ is the control coefficient. It depends only on the passive optical link parameters, and therefore can be predetermined either by direct measurement with one predetermined channel drop pattern or by calculation from the known fiber parameters. Fiber delay line 2705 is introduced to optimize the required pump power adjustment relative to the input signal power variation.

EQ. 17 is a simplification of EQ. 2, where the number of wavelength regions (K) equals one. (Embodiments may also utilize a corresponding expression that is a simplification of EQ. 1.) However, embodiments of the invention support control circuit 2711 that utilizes EQ. 1 and EQ. 2 in order to support more than one wavelength regions. With EQ. 1, as previously discussed, the required power adjustment of the $j^{th}$ pump is expressed in linear scale.

With an embodiment of the invention, the gain profile variation during channel add/drop in a bidirectionally-pumped RFA can be greatly suppressed by only adjusting the forward Raman pump powers through a feed-forward configuration and a simple log-linear control algorithm, in which the required individual pump power adjustment of the forward Raman pumps are approximated as a log-linear function of the total input signal power variation. With the embodiment, only one control circuit (e.g., control circuit 2711 as shown in FIG. 27) is needed, thus eliminating the need of expensive channel monitoring. (Consequently, the cost for dynamic gain profile control in a bidirectionally-pumped RFA is reduced.). Moreover, the embodiment allows the pump control speed to be accelerated by using a simpler pump control algorithm and feed-forward configuration.

Figure 28:
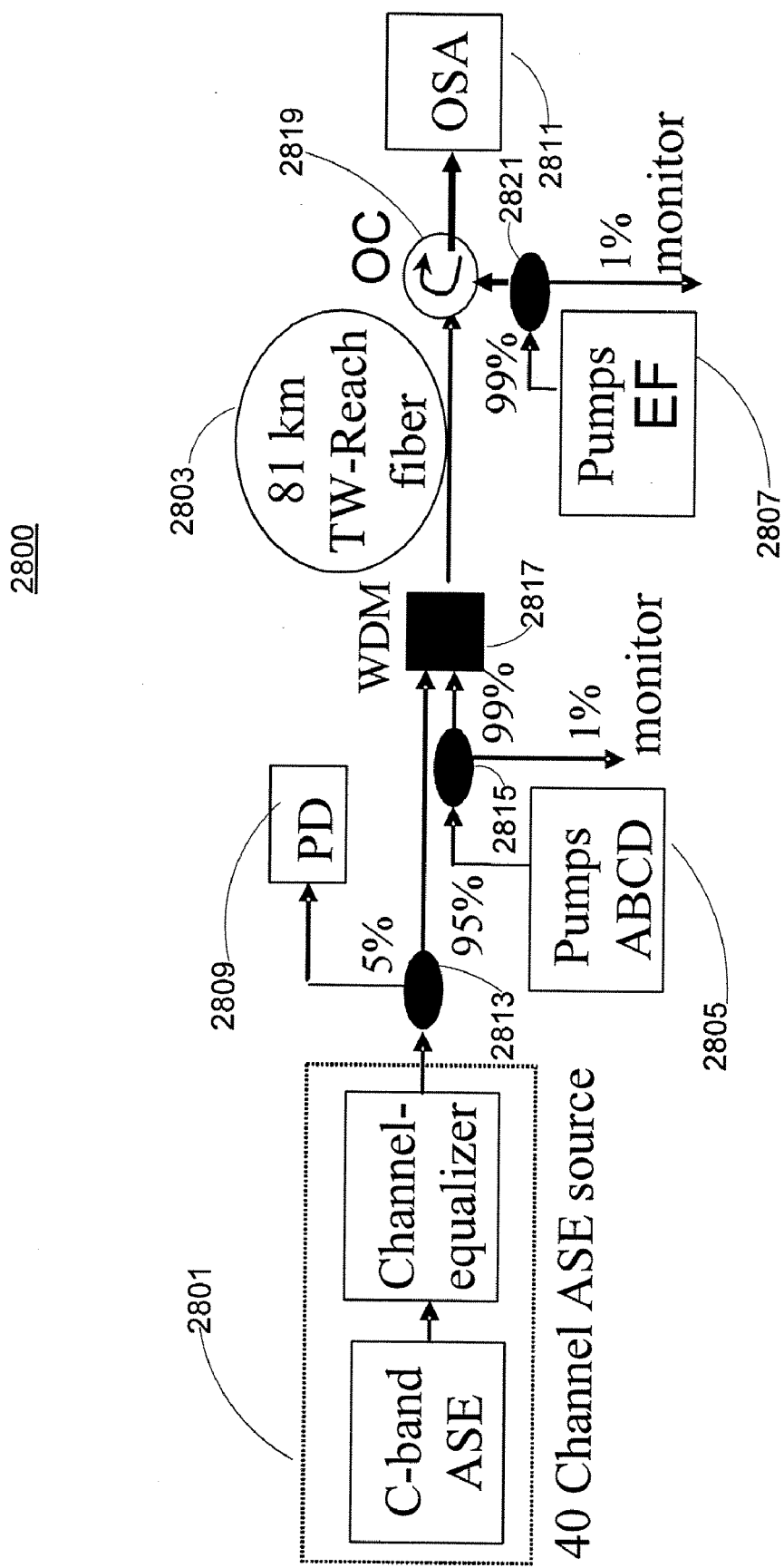
FIG. 28 shows an experimental setup for obtaining experimental results of a bidirectionally-pumped Raman amplifier in accordance with an embodiment of the invention.

FIG. 28 shows an experimental setup 2800 for obtaining experimental results of a bidirectionally-pumped Raman amplifier in accordance with an embodiment of the invention. The pump control algorithm is central to the effectiveness of setup 2800. Static experimentation suggests the verification of the control algorithm (e.g., EQ. 2 or EQ. 17). With experimental setup 2800, flat C-band ASE source 2801 (which includes an 80-channel, 50 GHz channel equalizer (or wavelength blocker)) to create up to 40 channels of sliced ASE at 100 GHz spacing. The purpose to use depolarized ASE source 2801 as the signal source in this experiment is to eliminate uncertainty caused by polarization-related issues. About 5% of the source output is coupled to power detector PD 2809 through coupler 2813 to obtain the input signal for the feed-forward algorithm. The four forward Raman pumps ABCD 2805 (inner-fiber grating stabilized Fabry-Perot lasers at 1425, 1436, 1452 and 1466 nm) are combined by WDM 2817 with the 40 channel source for launch into fiber 2803 at a signal level of −3 dBm/channel. TrueWave Reach fiber is used in setup 2800 because the stimulated Raman scattering (SRS) effect in such fiber is more severe than in SSMF, thus providing a more extreme condition for verifying the control algorithm. At the end of the fiber 2803, the two backward Raman pumps EF 2807 (external-fiber grating stabilized Fabry-Perot lasers at 1436 and 1461_nm) are fed into fiber 2803 through optical circulator 2819 while the signal is coupled out to OSA 2811 to monitor spectral flatness and total Raman gain per wavelength. Three reference flat gain profiles are measured with setup 2800. For all the three gain profiles, the launch pump powers from the two backward Raman pumps 2807 are fixed (E=250 mW and F=358 mW as monitored through coupler 2821), and the different gain profiles are achieved by purely changing the launch pump powers from the four forward Raman pumps 2805. The two backward Raman pumps 2807 provide about 15 dB±1.5 dB on/off Raman gain across the 40 channel for the case with full load and forward Raman pumps 2805 are turned off. For gain profile 1, 2 and 3, the total launch power from four forward Raman pumps 2805 at full load case are 324.6 mW, 421.6 mW, and 500.5 mW (as monitored through coupler 2815), respectively. The corresponding on/off Raman gain from forward Raman pumps 2805 alone are 8±0.5 dB, 10+0.5 dB, and 11.5+0.6 dB, respectively. For each gain profile (profiles 1-3), 4 control coefficients (e.g., as per EQ. 17) are determined by measuring the required individual pump power adjustments of four forward Raman pumps 2805 at one predetermined drop pattern (with uniform 10 surviving channels).

Figure 29:
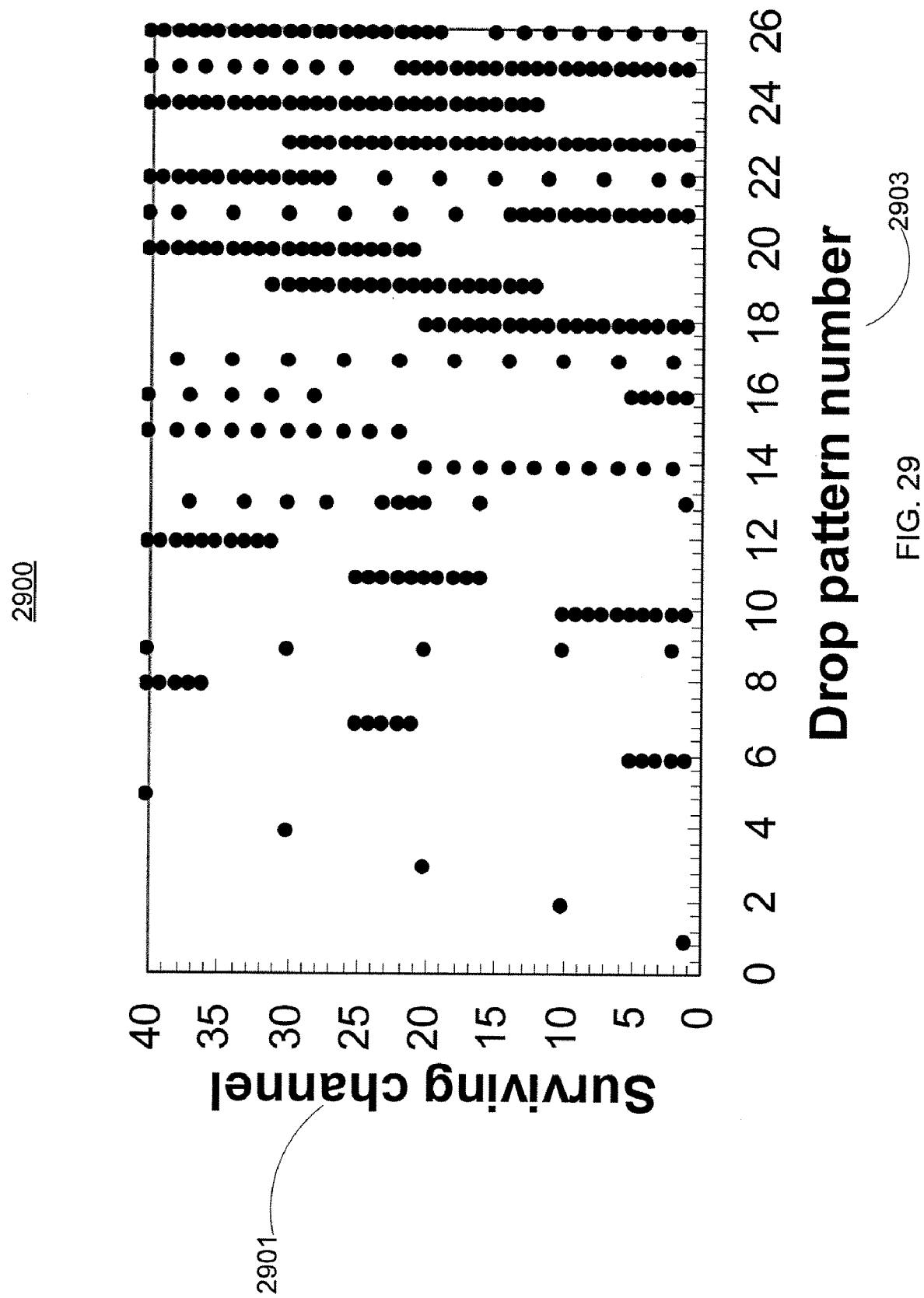
FIG. 29 shows a graphical representation of drop pattern channel numbers in accordance with an embodiment of the invention.

FIG. 29 shows graphical representation 2900 of drop pattern channel numbers in accordance with an embodiment of the invention. Surviving channel configuration 2901 is plotted as a function of drop pattern number 2903. After determining the control coefficients, the gain stability under 26 distinct channel drop patterns for each of the three gain profiles were tested. In an embodiment of the invention, the 26 channel drop patterns are different from the pattern used for control coefficient determination.

In an embodiment of the invention, the required individual pump power adjustment is obtained through a log-linear function (e.g., EQ. 17) of the detected total input signal power variation. The control algorithm has been verified with 26 distinctive drop patterns and three different gain profiles for a C-band RFA with four forward Raman pumps and two backward Raman pumps. With the control algorithm enabled, the maximum static gain error (the worst channel, relative to the full load case) is suppressed to below 0.4 dB for all the 26 drop patterns and the three different gain profiles, while the maximum static gain errors go up to 8 dB without gain control.

Figure 30:
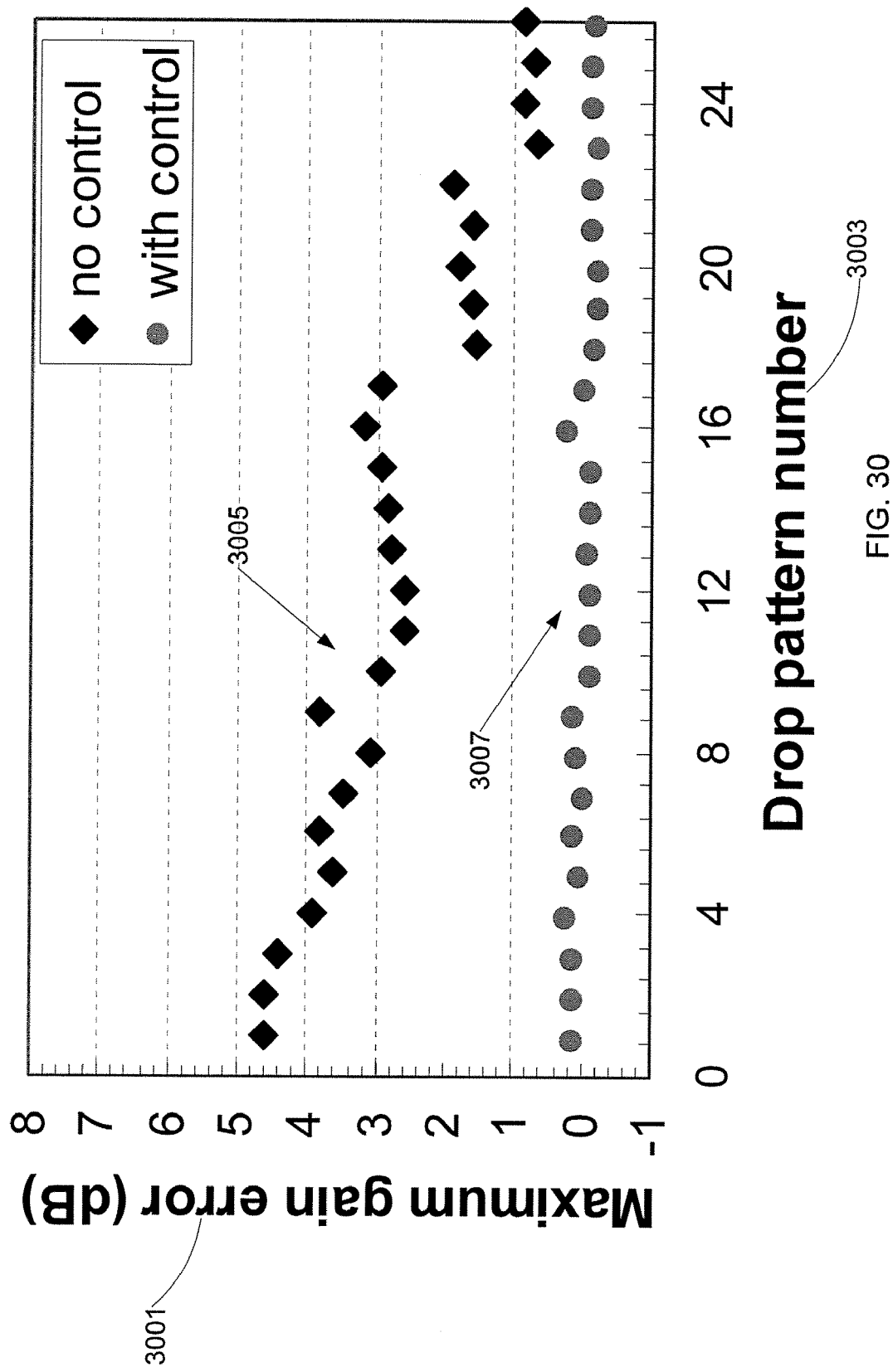
FIG. 30 shows maximum gain error with a first gain profile in accordance with an embodiment of the invention.
Figure 31:
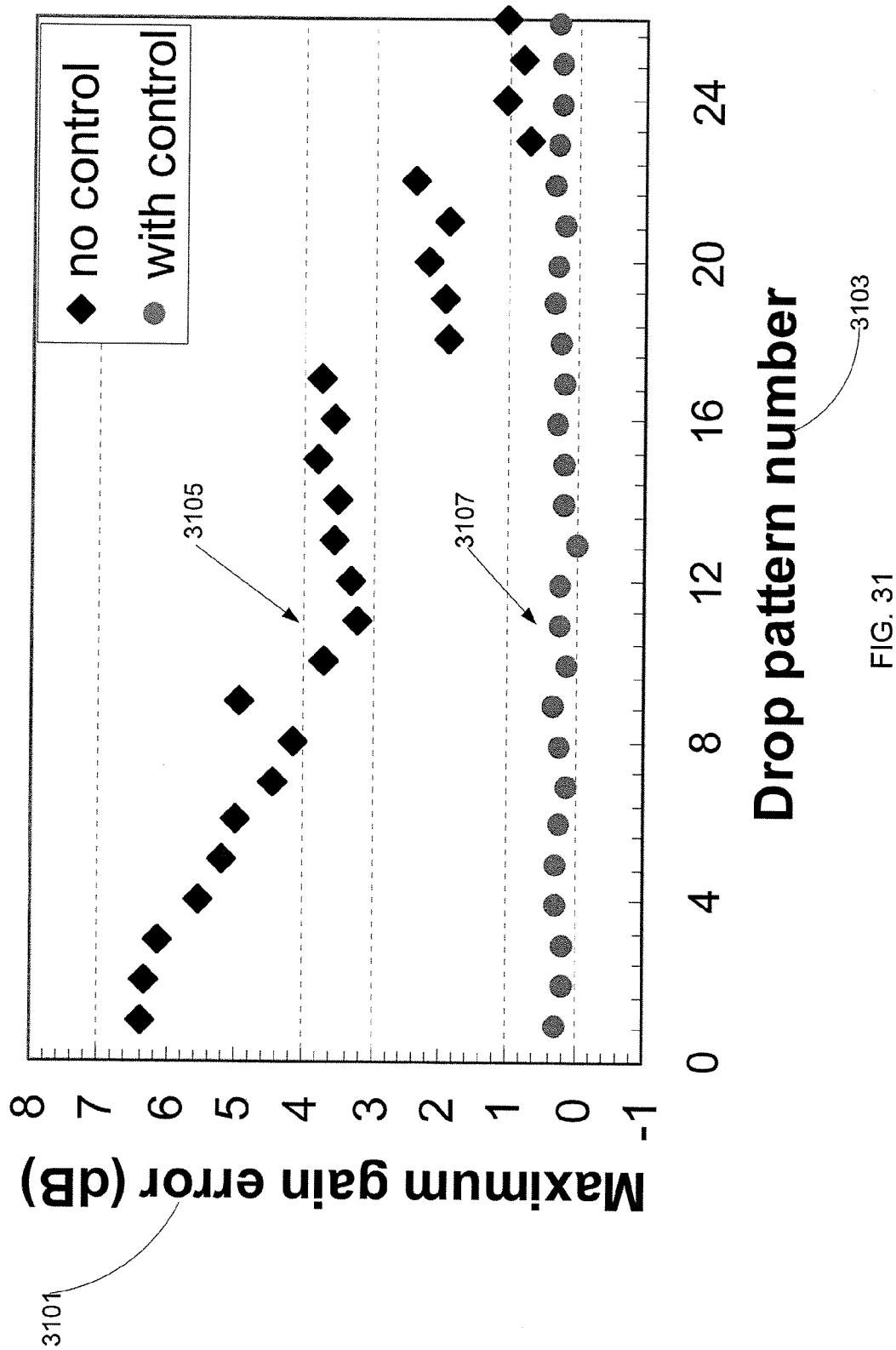
FIG. 31 shows maximum gain error with a second gain profile in accordance with an embodiment of the invention.
Figure 32:
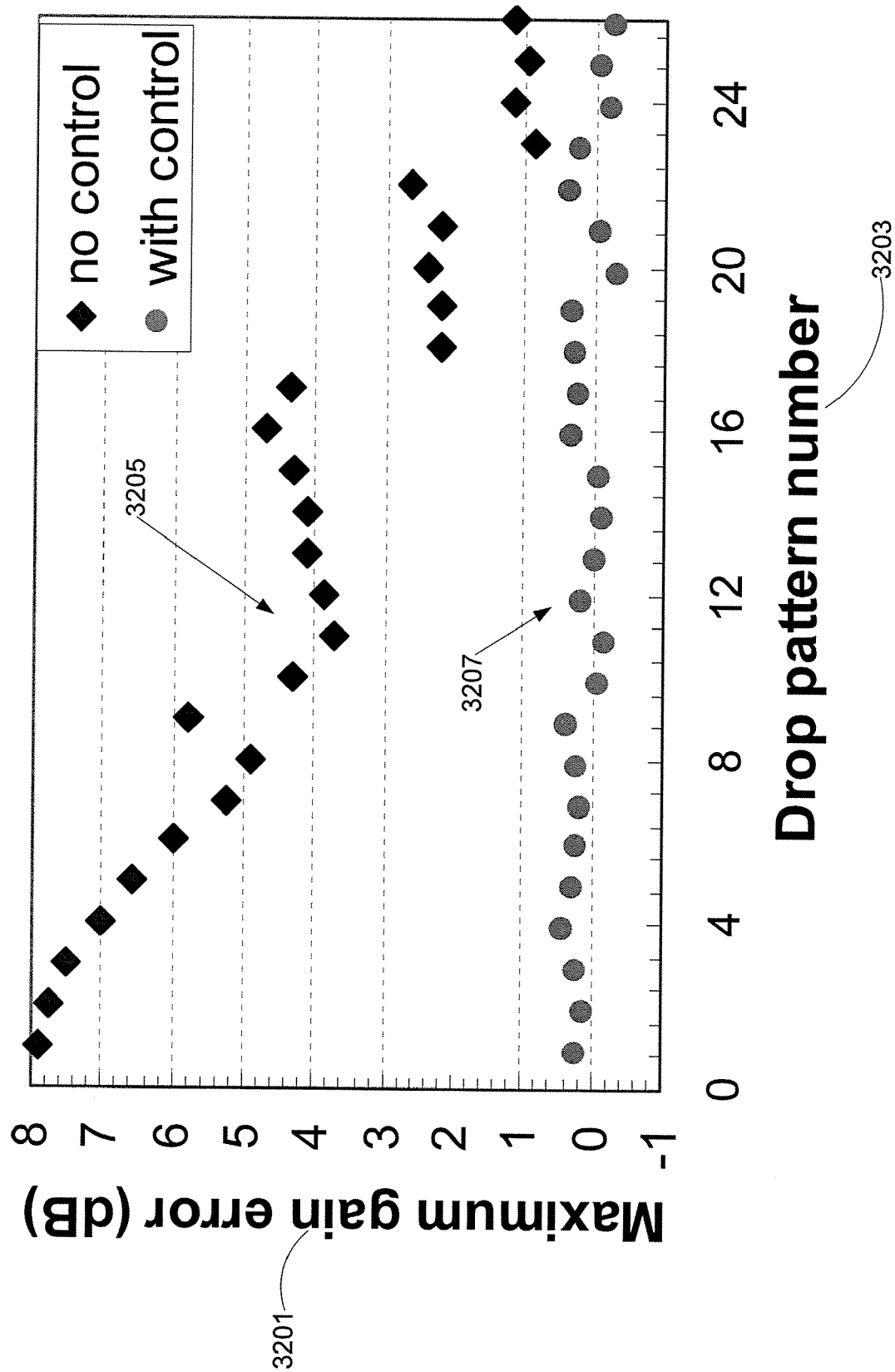
FIG. 32 shows maximum gain error with a third gain profile in accordance with an embodiment of the invention.

FIG. 30 shows maximum gain error with a first gain profile in accordance with an embodiment of the invention. FIG. 31 shows maximum (lain error with a second gain profile in accordance with an embodiment of the invention. FIG. 32 shows maximum gain error with a third gain profile in accordance with an embodiment of the invention. The measured maximum gain error 3001, 3101, 3201 (i.e., most severe wavelength) as a function of drop pattern numbers 3003, 3103, and 3203 are shown with pump control (corresponding to plots 3007, 3107, and 3207) and without pump control (corresponding to plots 3005, 3105, and 3205). Without control, one can see the gain error may be as high as 8 dB for channel pattern number 1 and gain profile 3. When control enabled, however, the residual gain error is better than 0.4 dB in all cases, suggesting that the control algorithm works well for widely diverse spectral loading and different gain levels, even in a deep saturation mode.

Figure 33:
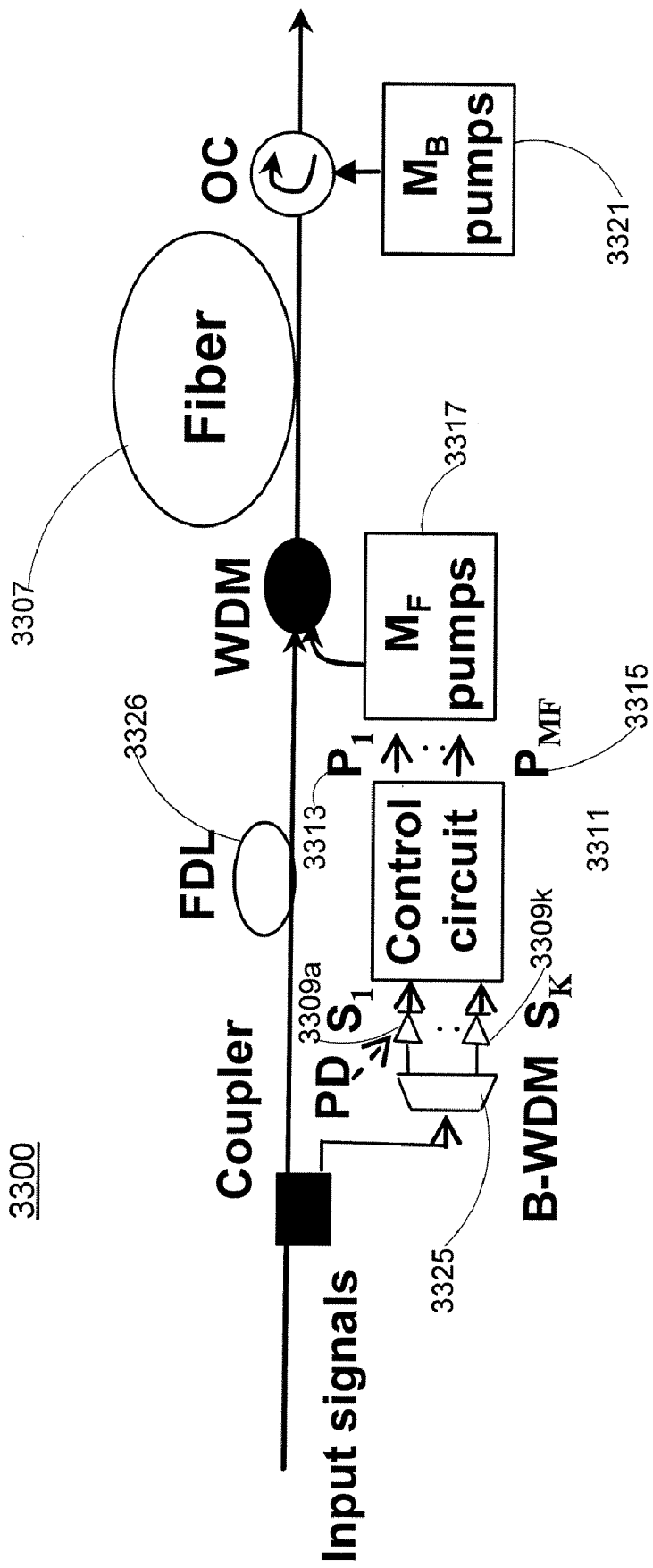
FIG. 33 shows an apparatus for controlling a bidirectionally-pumped Raman amplifier having a plurality of wavelength regions in accordance with an embodiment of the invention.

FIG. 33 shows an apparatus 3300 for controlling a bidirectionally-pumped Raman amplifier having a plurality of wavelength regions in accordance with an embodiment of the invention. FIG. 33 shows an embodiment of the invention with two cascaded RFAs, where a forward-pumped RFA has $M_F$ forward Raman pumps 3317 and a backward-pumped RFA with $M_B$ backward Raman pumps 3321 using the same fiber 3307 as the gain medium and the overall gain is controlled by only adjusting the pump power of the forward Raman pumps. A small part of the input signal power is extracted and then divided into K wavelength regions with a band wavelength-division multiplexer (B-WDM) 3325. The total power in each of the K wavelength regions is then detected by a corresponding photo-detector (PD) 3309a-3309k to monitor the total input power in each corresponding wavelength region, $S_1 \ldots S_K$, which is then sent to control unit 3311 of the forward-pumped RFA as the feed-forward signal. During channel add/drop, the required power adjustment ($P_1$ 3313 ... $P_{MF}$ 3315, relative to a reference operating point, e.g., with full channel load or half channel load) for each of the $M_F$ forward Raman pumps 3317 may be determined by using one of the following two linear equations $$P_d(j) \approx P_{do}(j) + \sum_{k=1}^{K} T_{dL}(j,k)[S_L(k) - S_{L0}(k)] \quad \text{EQ. 18}$$

$$P_L(j) \approx P_{L0}(j) + \sum_{k=1}^{K} T_{LL}(j,k)[S_L(k) - S_{L0}(k)] \quad \text{EQ. 19}$$

where $P_d(j)$ and $P_L(j)$ denote the required powers of the $j^{th}$ pump in log scale and linear scale, respectively, $S_L(k)$ denotes the detected input signal power in the $k^{th}$ wavelength region as linear scaled. $P_{d0}(j)$ or $P_{L0}(j)$ and $S_{L0}(k)$ denote the corresponding pump and signal powers at a reference operating point. $T_{dL}(j,k)$ and $T_{LL}(j,k)$ denote the linear control coefficients, which depend only on the passive optical link parameters, and therefore may be predetermined either by direct measurement with a K predetermined channel pattern or by calculation from the known fiber parameters. The subscript d and L denote log scale and linear scale, respectively. Note that EQ. 18 reduces to EQ. 17 when K=1.

A fiber delay line 3326 may be introduced to compensate the possible time delay in the control branch. A simple method for determination of $T_{dL}(j,k)$ and $T_{LL}(j,k)$ is given as follows. One configures the signal channels so that the detected signal input power is different from a reference point in the $k^{th}$ wavelength region. One then measures or calculates the required power adjustment of each Raman pump (to maintain the signal power level per channel at the output of the two cascaded RFAs to the target level). Letting $\Delta S_L(k)$ denote the detected static input signal power variation in the $k^{th}$ wavelength region, $\Delta P_d(j)$ or $\Delta P_L(j)$ denotes the required static power adjustment of $j^{th}$ pump as log scaled or as linear scaled, respectively. Then one obtains $T_{dL}(j,k)=\Delta P_d(j)/\Delta S_L(k)$ or $T_{LL}(j,k)=\Delta P_L(j)/\Delta S_L(k)$.

The required pump power for each of the four forward-pumped Raman pumps under various channel patterns are calculated by using EQ. 18 or EQ. 19, in which K=1 with the determined control coefficients. (As previously discussed, EQ. 18 reduces to EQ. 17 when K=1.) As an illustrated example, EQs. 20a-20d give the four linear pump control equations for gain profile 2 in accordance with EQ. 18:

$$P_{dBm}(1) \approx 21.75 + 0.0046(S_{mW} - 20) \quad \text{EQ. 20a}$$

$$P_{dBm}(2) \approx 20.49 + 0.011(S_{mW} - 20) \quad \text{EQ. 20b}$$

$$P_{dBm}(3) \approx 17.68 + 0.009(S_{mW} - 20) \quad \text{EQ. 20c}$$

$$P_{dBm}(4) \approx 20.05 + 0.001(S_{mW} - 20) \quad \text{EQ. 20d}$$

while EQs. 21a-21d give the corresponding equations in accordance with EQ. 19:

$$P_{mW}(1) = 149.8 + 1.34(S_{mW} - 20) \quad \text{EQ. 21a}$$

$$P_{mW}(2) \approx 112.0 + 1.82(S_{mW} - 20) \quad \text{EQ. 21b}$$

$$P_{mW}(3) \approx 58.7 + 0.9(S_{mW} - 20) \quad \text{EQ. 21c}$$

$$P_{mW}(4) \approx 101.2 + 0.24(S_{mW} - 20) \quad \text{EQ. 21d}$$

where $S_{mW}$ denotes the detected total input signal power (mW). Note that the 26 channel drop patterns are different from the pattern used for control coefficient determination.

The above discussion is based on the static aspects. One may also include the dynamic aspects when controlling the pump powers. Letting TB denote the response time of the backward-pumped RFA, the two dynamic control equations may be given by $$\Delta P_d(j,t) \approx \sum_{k=1}^{K} T_{dL}^F(j,k)\Delta S_L(k,t) + \quad \text{EQ. 22}$$
$$\sum_{k=1}^{K} [T_{dL}(j,k) - T_{dL}^F(j,k)] \left[ \int_0^{TB} \Delta S_L(k, t-t') f_B(t') dt' \right]$$

$$\Delta P_L(j,t) \approx \sum_{k=1}^{K} T_{LL}^F(j,k)\Delta S_L(k,t) + \quad \text{EQ. 23}$$
$$\sum_{k=1}^{K} [T_{LL}(j,k) - T_{LL}^F(j,k)] \left[ \int_0^{TB} \Delta S_L(k, t-t') f_B(t') dt' \right]$$

where $\Delta P_d(j,t)$ and $\Delta P_L(j,t)$ denote the required power adjustment of the $j^{th}$ forward pump at time instant t in log scale and linear scale, respectively, and $\Delta S_L(k,t)$ denotes the detected input signal power variation in linear units. $T_{dL}^F(j,k)$ and $T_{LL}^F(j,k)$ denote the linear control coefficients for the forward-pumped RFA only (the case that all the backward-pumps are turned off), while the $T_{dL}(j,k)$ and $T_{LL}(j,k)$ denote the linear control coefficients for the cascaded two RFAs as is discussed in the above. $f_B(t)$ is a function related to the response function of the backward-pumped RFA. In many typical cases, $f_B(t)$ may be approximated as $$f_B(t) = \begin{cases} t/TB & t > 0 \text{ and } t < TB \\ 0 & \text{else} \end{cases} \quad \text{EQ. 24}$$

The first part of EQ. 22 and EQ. 23 controls the gain transient due to essentially instantaneous co-propagating signal-signal and signal-pump Raman interaction, while the second part mainly controls the relatively slow gain transients due to counter-propagating signal-pump Raman interaction.

Figure 34:
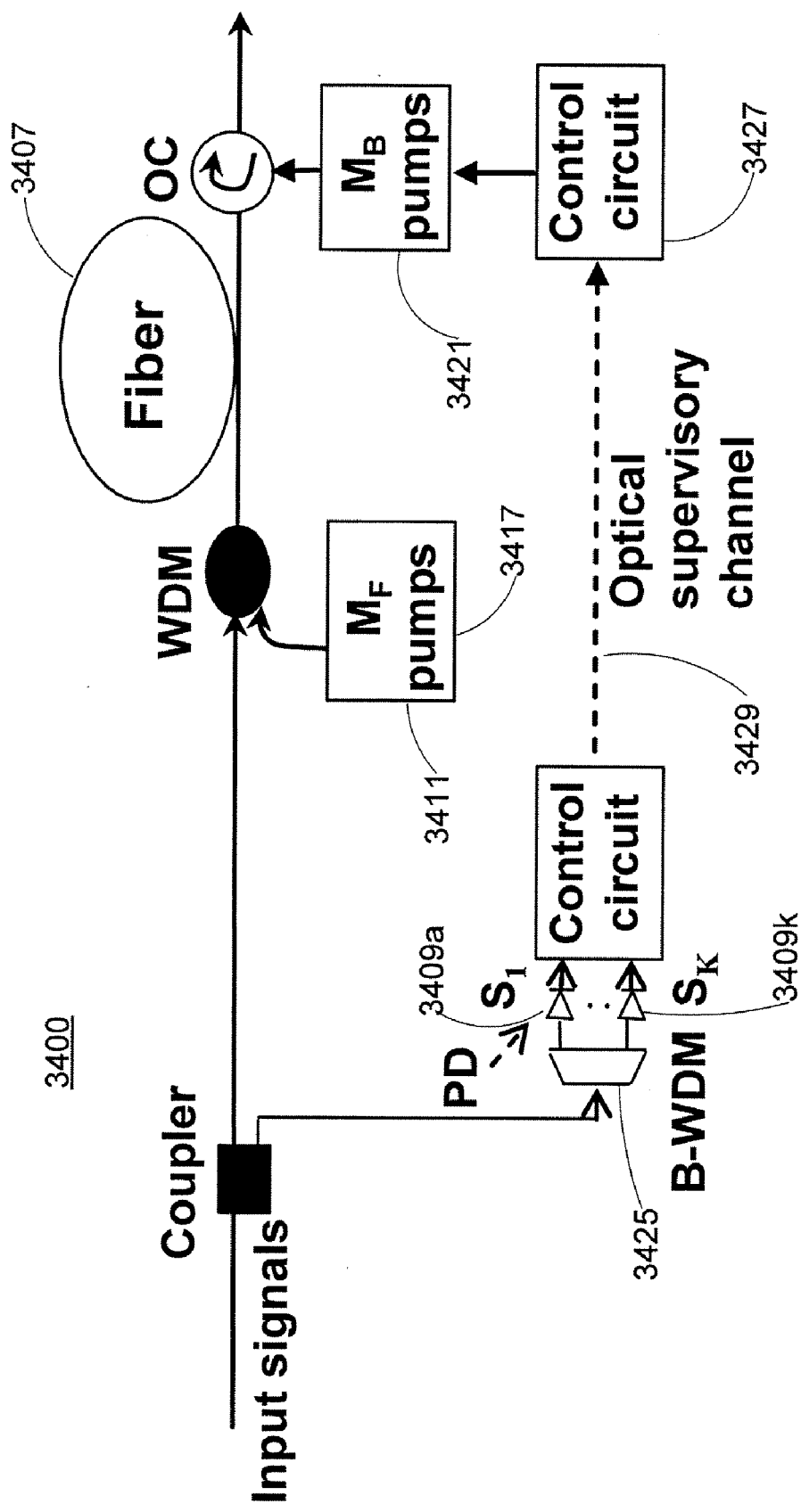
FIG. 34 shows an apparatus for controlling a forward-pumped Raman amplifier and a backward-pumped Raman amplifier in accordance with an embodiment of the invention.

FIG. 34 shows an apparatus 3400 for controlling a forward-pumped Raman amplifier (corresponding to forward pumps 3417) and a backward-pumped Raman amplifier (corresponding to backward pumps 3721) in accordance with an embodiment of the invention. A small part of the input signal power is extracted and then divided into K wavelength regions with a band wavelength-division multiplexer (B-WDM) 3425. The total power in each of the K wavelength regions is then detected by a corresponding photodetector (PD) 3409a-3409k to monitor the total input power in each wavelength region, $S_1 \ldots S_K$, which is processed by control unit 3411.

In the case that the events causing the input signal power variation are managed more slowly than the response time of a backward-pumped RFA (tens to hundreds of microseconds) or the system requirement on the transient control speed is relaxed under some circumstances, the overall gain of the above two cascade RFAs may also be controlled by purely adjusting the power of the backward Raman pumps 3421 using either of the following two dynamic control equations $$P_d(j,t) \approx P_{do}(j,t) + \sum_{k=1}^{K} T_{dL}(j,k)[S_L(k,t-T) - S_{L0}(k)] \quad \text{EQ. 25}$$

$$P_L(j,t) \approx P_{L0}(j,t) + \sum_{k=1}^{K} T_{LL}(j,k)[S_L(k,t-T) - S_{L0}(k)] \quad \text{EQ. 26}$$

where T denotes the optimal time delay between the required pump power adjustment and the detected signal power variation. T is typically approximately equal to the propagation time of the signal in the fiber 3407. (As an example, events may correspond to changes of the channel reconfiguration for cascaded Raman fiber amplifiers.) Power adjustment information from control circuit 3411 is sent to control circuit 3427 over optical supervisory channel 3429 (which is physically provided by an optical channel that is transmitted over fiber facility 3407). Control circuit 3427 subsequently adjusts the power levels of backward pumps 3421 in accordance with the power adjustment information. (In the embodiment, power adjustment information corresponds to results from calculating EQ. 25 or EQ. 26.) The power levels of forward pumps 3417 are maintained at an approximately constant power level.

Figure 35:
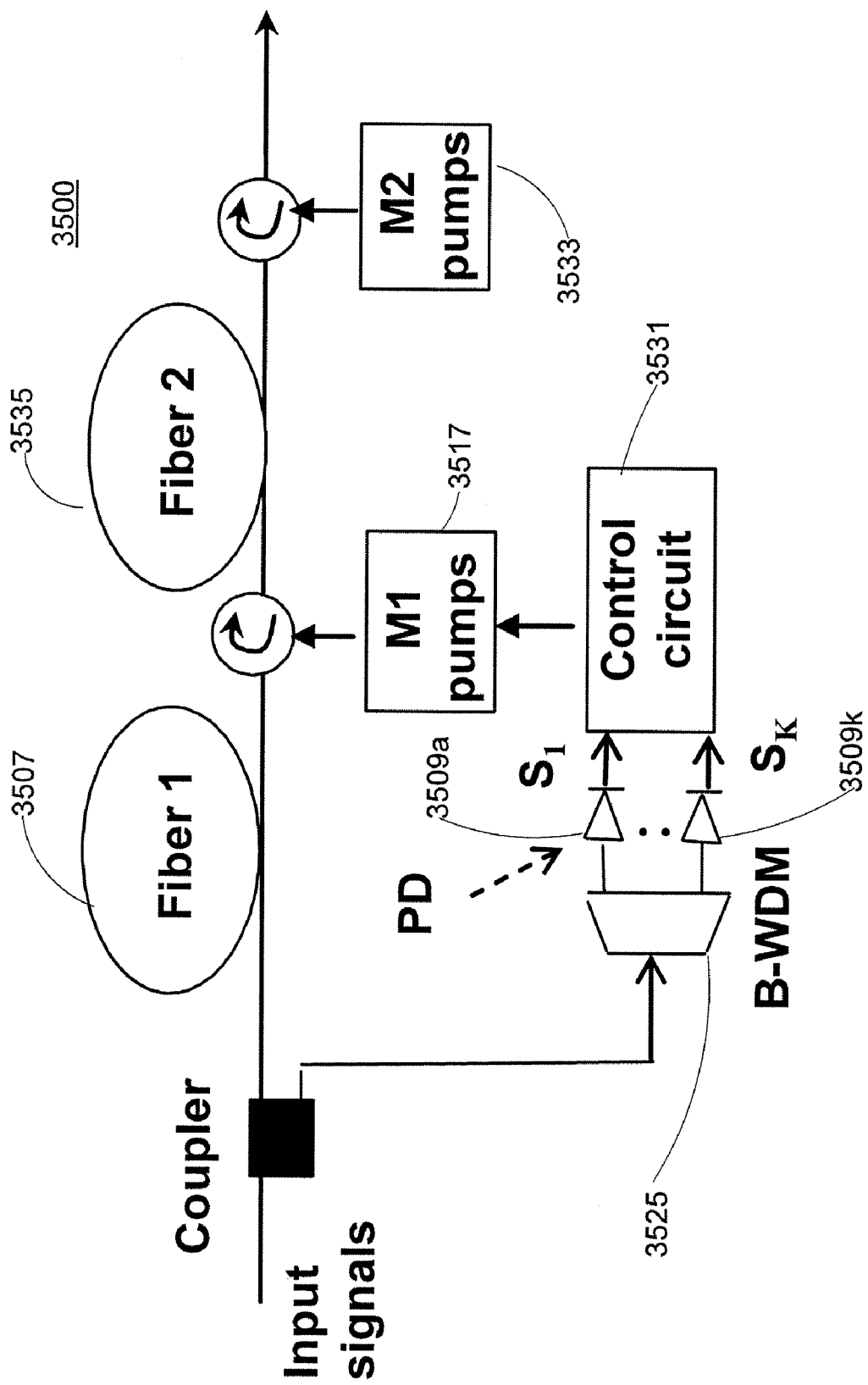
FIG. 35 shows an apparatus for controlling a backward-pumped Raman amplifier to control an overall gain of two backward-pumped Raman amplifiers in accordance with an embodiment of the invention.

FIG. 35 shows apparatus 3500 for controlling a backward-pumped Raman amplifier to control an overall gain of two backward-pumped Raman amplifiers over two fiber facilities 3507 and 3535 in accordance with an embodiment of the invention. With apparatus 3500, the overall gain of two backward-pumped RFAs (which are essentially independent) is controlled by only adjusting the pump powers of the first backward-pumped RFA 3517 (associated with fiber facility 3507), while the pump powers of the second backward-pumped RFA 3533 (associated with fiber facility 3535) are maintained at an approximately constant power level. For this case, EQ. 25 or EQ. 26 may be used as the dynamic control equation, but T is roughly equal to the propagation time of the signal in the first backward-pumped RFA.

A small part of the input signal power is extracted and then divided into K wavelength regions with a band wavelength-division multiplexer (B-WDM) 3525. The total power in each of the K wavelength regions is then detected by a corresponding photodetector (PD) 3509a-3509k to monitor the total input power in each wavelength region, $S_1 \ldots S_K$, which is then processed by control unit 3531 to adjust the first backward pumps 3517.

Figure 36:
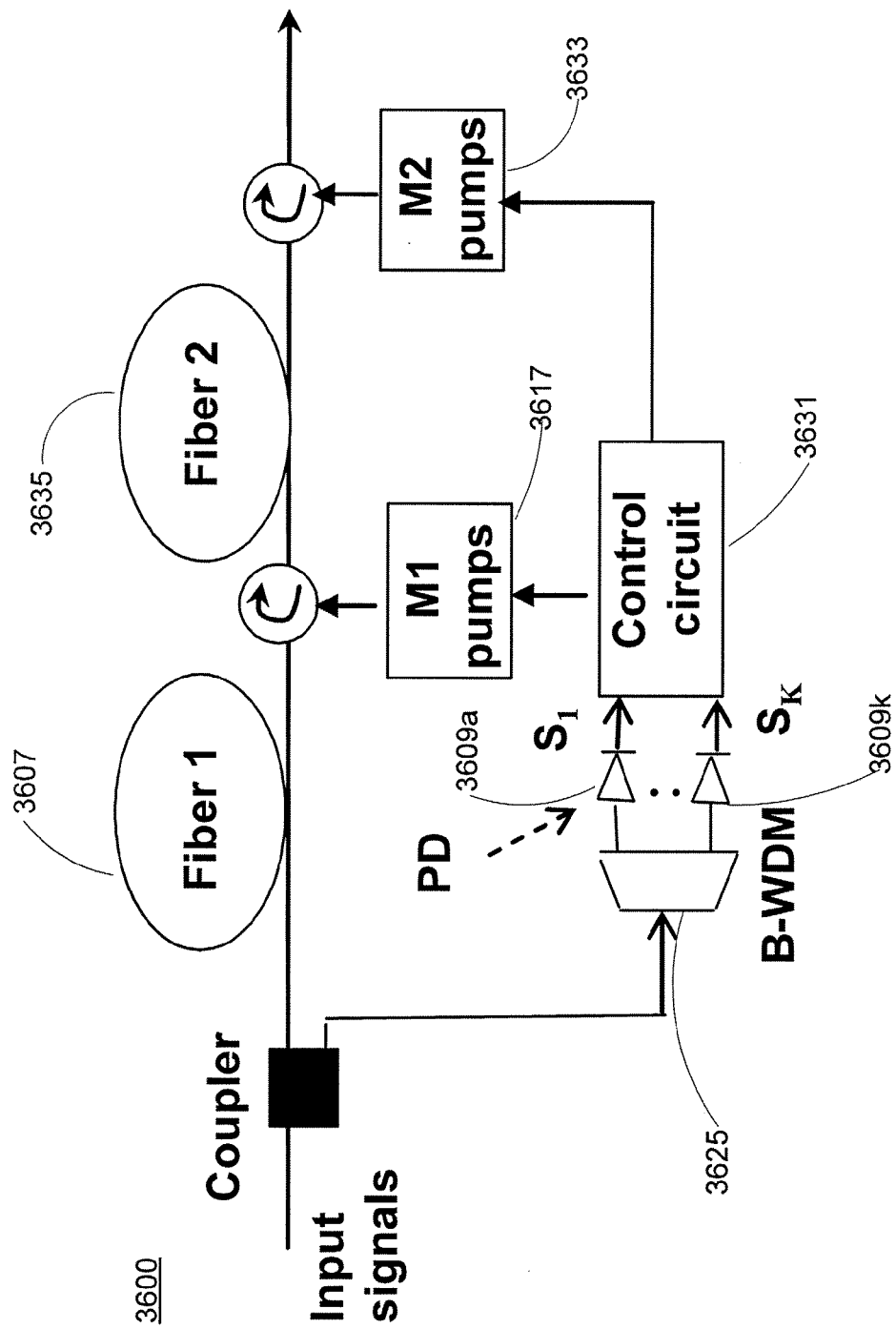
FIG. 36 shows an apparatus for controlling two cascaded backward-pumped Raman amplifiers in accordance with an embodiment of the invention.

FIG. 36 shows an apparatus 3600 for controlling two cascaded backward-pumped Raman amplifiers in accordance with an embodiment of the invention. With the embodiment, the overall gain of two backward-pumped RFAs (corresponding to pumps 3517 and 3533) is controlled by adjusting the pump powers of both RFAs but using the same feed-forward signal. EQ. 25 or EQ. 26 may be used as the dynamic control equation for both RFAs but with different control coefficients. The time delay T for the first backward-pumped RFA 3517 is approximately equal to the propagation time of the signal in the first backward-pumped RFA while the time delay T for the second backward-pumped RFA 3633 is approximately equal to the propagation time of the signal in both backward-pumped RFAs A small part of the input signal power is extracted and then divided into K wavelength regions with a band wavelength-division multiplexer (B-WDM) 3625. The total power in each of the K wavelength regions is then detected by a corresponding photodetector (PD) 3609a-3609k to monitor the total input power in each wavelength region, $S_1 \ldots S_K$, which is then processed by control unit 3631 to adjust the backward pumps 3617 and 3633.

Figure 37:
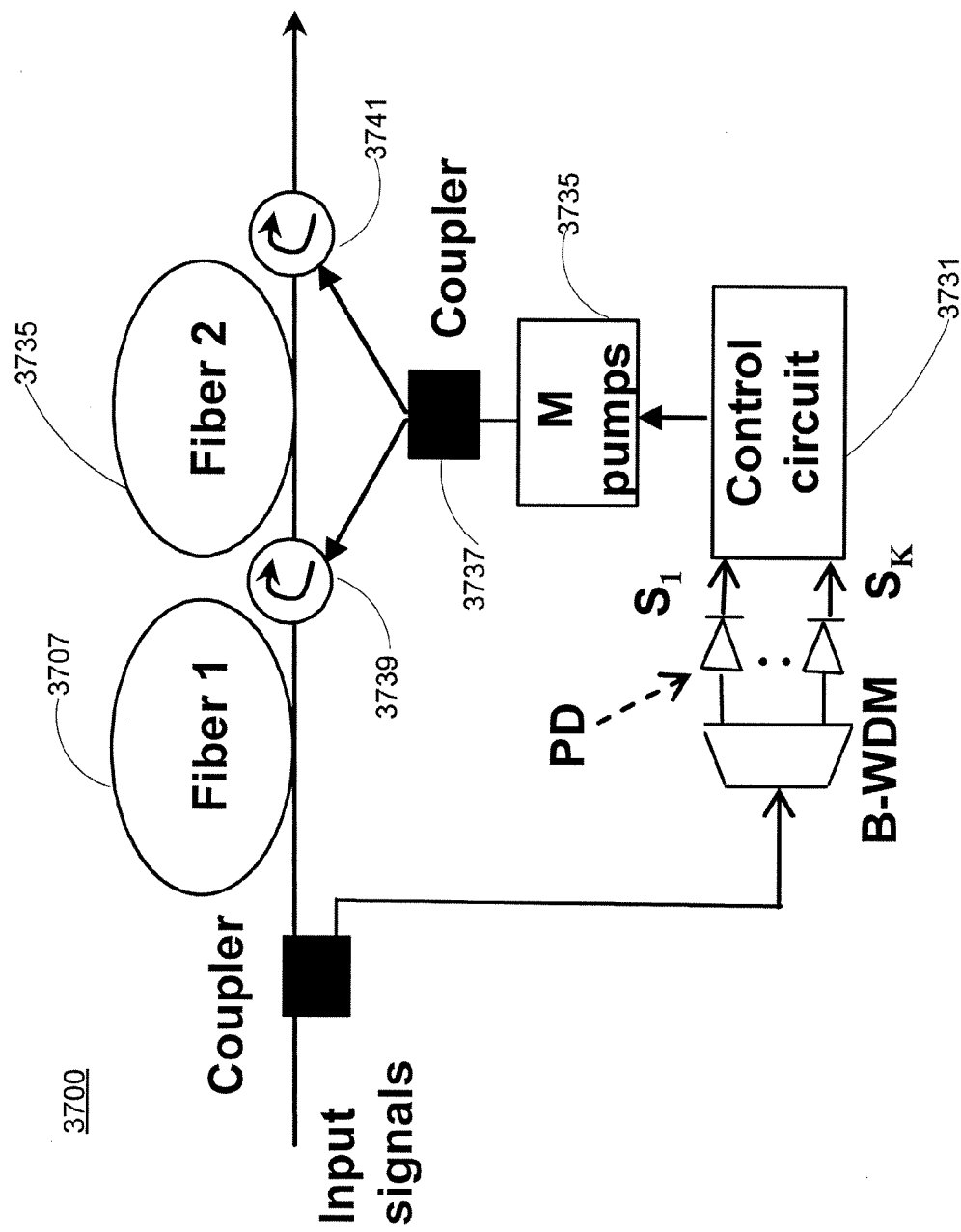
FIG. 37 shows an apparatus for controlling two cascaded backward-pumped Raman amplifiers having the same pump wavelengths in accordance with an embodiment of the invention.

FIG. 37 shows apparatus 3700 for controlling two cascaded backward-pumped Raman amplifiers having the same pump wavelengths in accordance with an embodiment of the invention. Apparatus 3700 is similar to apparatus 3600, as previously discussed. However, pumps 3735 support Raman amplification for both fiber facility 3707 and fiber facility 3735 through coupler 3737 and through optical circulators 3739 and 3741, respectively. Control circuit 3731 determines the power adjustment for each pump using EQ. 25 or EQ. 26. (The pump powers launched into fiber facilities 3707 and 3735 may be different by using different power splitting ratio of coupler 3707.)

The configurations shown in FIGS. 35-37 support cascaded backward-pumped Raman amplifiers. Moreover, embodiments of the invention support configurations having cascaded forward-pumped Raman amplifiers in lieu of cascaded reverse-pumped Raman amplifiers. Accordingly, M1 forward Raman pumps are coupled to a first fiber facility through a first wavelength-division multiplexer (WDM), and M2 forward Raman pumps are coupled to a second fiber facility through a second wavelength-division multiplexer.

As with the configurations having cascaded backward-pumped Raman amplifiers, EQ. 25 or EQ. 26 may be applied. For the case with cascaded forward-pumped Raman amplifiers, T is approximately equal to zero, but a fiber delay line may be added into the signal path to synchronize the transmitted signal and the control signal.

Referring to FIGS. 35-37, embodiments of the invention also support cascaded RFA configurations, in which a forward-pumped Raman amplifier is associated with one of the fiber facilities and a backward-pumped Raman amplifier is associated with the other fiber facility. Moreover, only one Raman fiber amplifier is adjusted to adapt to dynamic channel loading, while the pump power levels of the other Raman fiber amplifier are maintained at approximately constant values. When determining adjusted values of the adjustable Raman amplifier, one may utilize EQ. 25 or EQ. 26 as previously discussed. The time delay T between the required pump power adjustment and the detected input signal power variation depends on the location of the amplifier requiring pump power adjustment, which is approximately equal to the propagation time of signal from the signal power monitoring point to the entering point of the adjusted pump power. In addition, a cascaded Raman amplifier configuration may include more than two Raman fiber amplifiers, e.g., three or four Raman fiber amplifiers. Each of Raman fiber amplifiers may be a forward-pumped Raman fiber amplifier or a backward-pumped Raman fiber amplifier. (For example, the constituent Raman fiber amplifiers may be a combination of forward-pumped Raman amplifiers and backward-pumped Raman amplifiers.) Gain transients generated from the cascaded Raman fiber amplifiers are controlled by adjusting the Raman pumps of only one Raman amplifier through a linear/log linear feed-forward gain control circuit or by adjusting the Raman pumps of all the Raman fiber amplifiers using the same feed-forward signal (i.e., signal power variation is monitored only at one point).

Embodiments of the invention may support a number of cascaded RFAs that is greater than two. Active or passive components/subsystems may be added between two cascaded RFAs. In addition, the proposed feed-forward control circuit may be the only gain transient control circuit; however, a combination of the proposed feed forward control technique and the traditional feed-back control technique may also be used for overall gain control. For example, the fast feed-forward gain control technique may be used to control very fast gain transients due to co-propagating signal-signal Raman interaction and signal-pump Raman interaction (if a forward-pumped RFA is used), while the traditional feedback-based control technique is used to control relatively slow counter-propagating signal-pump Raman interaction in a backward-pumped RFA.

Embodiments of the invention also support gain control for a conventional EDFA/EDWA amplifier, which can be viewed as a variant of the discrete Raman amplifier.

Finally, one observes that, if the transmission fiber is replaced by an Erbium doped fiber/waveguide, and the pump wavelength are chosen to be 980 nm and/or 1480 nm, the above considerations are also applicable to the dynamic gain control for an Erbium-doped fiber/waveguide amplifier. Embodiments may support a bi-directionally-pumped Raman fiber amplifier or a bi-directionally-pumped Erbium doped fiber amplifier.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry. Other hardware approaches such as DSP (digital signal processor) and FPGA (field programmable gate array) may also be used to implement the exemplary embodiments.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for controlling a total gain of cascaded Raman fiber amplifiers in an optical fiber system that supports a plurality of optical signal channels, the method comprising:
   (a) determining an input signal power variation for at least one wavelength region, the plurality of optical signal channels being associated with the at least one wavelength region, wherein K denotes a number of wavelength regions;
   (b) determining a pump power adjustment for an adjustable optical pump using a dynamic control equation, the dynamic control equation relating the input signal power variation for the at least one wavelength region to the pump power adjustment for the adjustable optical pump, the dynamic control equation depending on a response time of the cascaded Raman fiber amplifiers and on a time instant; and
   (c) adjusting the adjustable optical pump in accordance with the pump power adjustment, wherein:
   (1) the cascaded Raman fiber amplifiers include a forward-pumped Raman fiber amplifier having at least one forward optical pump and a backward-pumped Raman fiber amplifier having at least one backward optical pump,
   (2) the adjustable optical pump being the at least one forward optical pump, and
   (3) the dynamic control equation including a first component and a second component, the first component corresponding to a first gain transient resulting from an essentially instantaneous co-propagating signal-to-signal and signal-to-pump Raman interaction, the second component corresponding to a second gain transient resulting from a counter-propagating signal-to-pump Raman interaction.

2. The method of claim 1, the forward pump power adjustment for the $j^{th}$ forward optical pump with a logarithmic scale, the first component comprising:

$$\sum_{k=1}^{K} C_{dL}^{F}(j, k) \Delta S_L(k, t), \text{ wherein}$$

t denotes the time instant, $C_{dL}^{F}(j, k)$ denotes a linear control coefficient for the forward-pumped Raman fiber amplifier and $\Delta S_L(k,t)$ denotes the input signal power variation.

3. The method of claim 2, the second component comprising:

$$\sum_{k=1}^{K} [C_{dL}(j, k) - C_{dL}^{F}(j, k)] \left[ \int_{0}^{TB} \Delta S_L(k, t - t') f_B(t') dt' \right], \text{ wherein}$$

TB denotes a response time of the backward-pumped Raman fiber amplifier,
$C_{dL}(j, k)$ denotes a linear control coefficient for the cascaded Raman fiber amplifiers, and
$f_B(t)$ is a response function of the backward-pumped Raman fiber amplifier.

4. The method of claim 3, the response function being approximated by:

$$f_B(t) = \begin{cases} t/TB & t > 0 \text{ and } t < TB \\ 0 & \text{otherwise} \end{cases}$$

5. A method for controlling a total gain of cascaded Raman fiber amplifiers that include a forward-pumped Raman fiber amplifier having at least one forward optical pump and a backward-pumped Raman fiber amplifier having at least one backward optical pump in an optical fiber system that supports a plurality of optical signal channels, the cascaded Raman fiber amplifiers having a feed-forward configuration, the method comprising:
   (a) determining an input signal power variation for at least one wavelength region, the plurality of optical signal channels being associated with the at least one wavelength region;

(b) determining a forward pump power adjustment for the at least one forward optical pump using a dynamic control equation, the dynamic control equation including a first component and a second component, the first component corresponding to a first gain transient resulting from an essentially instantaneous co-propagating signal-to-signal and signal-to-pump Raman interaction, the second component corresponding to a second gain transient resulting from a counter-propagating signal-to-pump Raman interaction, the dynamic control equation relating the input signal power variation for the at least one wavelength region to the forward pump power adjustment for the at least one forward optical pump; and (c) adjusting the at least one forward pump optical pump in accordance with the forward pump power adjustment.

* * * * *